(12) United States Patent
Iura et al.

(10) Patent No.: US 7,612,518 B2
(45) Date of Patent: Nov. 3, 2009

(54) INVERTER APPARATUS AND METHOD OF REDUCING SPEED OF ALTERNATING CURRENT MOTOR

(75) Inventors: Hideaki Iura, Kitakyushu (JP); Kazuhiko Hiramatsu, Kitakyushu (JP)

(73) Assignee: Kabushiki Kaisha Yaskawa Denki, Fukuoka (JP)

( * ) Notice: Subject to any disclaimer, the term of this patent is extended or adjusted under 35 U.S.C. 154(b) by 295 days.

(21) Appl. No.: 11/631,788

(22) PCT Filed: Jul. 1, 2005

(86) PCT No.: PCT/JP2005/012199

§ 371 (c)(1),
(2), (4) Date: Mar. 8, 2007

(87) PCT Pub. No.: WO2006/004037

PCT Pub. Date: Jan. 12, 2006

(65) Prior Publication Data

US 2007/0216328 A1    Sep. 20, 2007

(30) Foreign Application Priority Data

Jul. 6, 2004    (JP) .............................. 2004-199699

(51) Int. Cl.
*H02P 27/06* (2006.01)
(52) U.S. Cl. ........................ 318/762; 318/800; 318/801; 318/811
(58) Field of Classification Search ................ 318/727, 318/762, 779, 801, 803, 807, 811, 700, 798, 318/800, 430, 268, 280, 362, 599, 778
See application file for complete search history.

(56) References Cited

U.S. PATENT DOCUMENTS

| 4,675,799 | A | * | 6/1987 | Suzuki et al. | 363/58 |
|---|---|---|---|---|---|
| 4,734,634 | A | * | 3/1988 | Kito et al. | 318/778 |
| 4,885,518 | A | * | 12/1989 | Schauder | 318/798 |
| 4,962,339 | A | * | 10/1990 | Schauder | 318/798 |
| 5,182,508 | A | * | 1/1993 | Schauder | 318/801 |
| 5,223,755 | A | * | 6/1993 | Richley | 327/158 |
| 5,291,388 | A | * | 3/1994 | Heinrich | 363/98 |
| 5,321,598 | A | * | 6/1994 | Moran | 363/41 |
| 5,541,488 | A | * | 7/1996 | Bansal et al. | 318/801 |
| 5,811,956 | A | * | 9/1998 | Yamamoto | 318/801 |

(Continued)

FOREIGN PATENT DOCUMENTS

JP    58-165695 A    9/1983

(Continued)

*Primary Examiner*—Bentsu Ro
*Assistant Examiner*—Antony M Paul
(74) *Attorney, Agent, or Firm*—Sughrue Mion, PLLC

(57) ABSTRACT

There is provided an inverter capable of reducing a speed in a short period of time without generating an overcurrent even in a case of an alternating current motor which is easy to be saturated magnetically.

A frequency of driving a motor is calculated by using a detecting value constituted by passing a direct current bus line voltage through a first filter portion, a voltage command is corrected by using a detecting value passing through a second filter portion, by making a time constant of the second filter portion larger than a time constant of the first filter portion in reducing a speed, the motor is brought into an overexcited state and loss is brought about in the motor.

30 Claims, 9 Drawing Sheets

U.S. PATENT DOCUMENTS

| | | | | |
|---|---|---|---|---|
| 6,008,618 | A | * 12/1999 | Bose et al. | 318/811 |
| 6,259,226 | B1 | * 7/2001 | Kaitani et al. | 318/798 |
| 6,316,904 | B1 | * 11/2001 | Semenov et al. | 318/727 |
| 6,459,230 | B1 | * 10/2002 | Tao | 318/798 |
| 7,084,604 | B2 | * 8/2006 | Salomaki | 318/811 |

FOREIGN PATENT DOCUMENTS

| | | |
|---|---|---|
| JP | 5-219771 A | 8/1993 |
| JP | 7-7981 A | 1/1995 |
| JP | 2001-95294 A | 4/2001 |
| JP | 2001-211680 A | 8/2001 |

* cited by examiner

INVERTER APPARATUS AND METHOD OF REDUCING SPEED OF ALTERNATING CURRENT MOTOR

TECHNICAL FIELD

The present invention relates to a method of reducing a speed of an alternating current motor by increasing loss thereof in an inverter apparatus for reducing the speed of the alternating current motor, particularly relates to a method and an apparatus of reducing a speed of an alternating current motor for preventing an inverter apparatus from being stopped abnormally, or preventing burning of the alternating current motor by a problem of overcurrent or the like when applied to an alternating current motor which is easy to be magnetically saturated.

BACKGROUND ART

As a related art, there is proposed an inverter apparatus of a voltage type for increasing a motor terminal voltage to thereby increase loss in braking. (refer to, for example, Patent Reference 1)

FIG. 10 is a block diagram of the inverter apparatus of the related art, commercial power source is converted into direct current by a rectifying portion 101, a voltage rectified thereby is smoothed by a capacitor 102 to be applied to an inverter portion 103. At the inverter portion 103, semiconductor elements are successively switched by a signal, mentioned later, to provide alternating current and an output of the alternating current is supplied to drive an alternating current motor 104. Here, the inverter portion 103 is provided with, for example, 6 pieces of transistors 201 through 206 and 6 pieces of diodes 207 through 212 as the semiconductor switching elements. On the other hand, numeral 111 designates a frequency setter, and an output signal Sa thereof is inputted to an acceleration/deceleration limiting circuit 120. The acceleration/deceleration limiting circuit increases the terminal voltage of the alternating current motor 104 by increasing a gain of a voltage control circuit 121 by a first output signal $Sb_1$ applied to the voltage control circuit 121 and a voltage/frequency converting circuit 114, and a second output signal $Sb_2$ applied only to the voltage control circuit 121 and showing that a speed is being operated to reduce. Further, the voltage/frequency converting circuit 114 is an analog/digital converting circuit outputting a pulse Sd having a frequency fd in proportion to a voltage Vb of the input signal $Sb_1$. Further, an output signal Sc of the voltage control circuit 113 and the output pulse fd of the voltage/frequency converting circuit 114 are applied to a modulating circuit 115. The modulating circuit 115 carries out a pulse width modulating control by applying a control pulse to the respective transistors 201 through 206 of the inverter 103 by way of a base drive circuit 116. On the other hand, an output voltage of the inverter 103 is determined by ON/OFF time periods of the respective transistors 201 through 206 controlled by a pulse width of the control pulse, and the pulse width of the control pulse is determined by an output voltage Vc of the voltage control circuit 121. Therefore, the base drive circuit 116 applied with the control pulse from the modulating circuit 115 is controlled to switch by outputting a base voltage and a base current in accordance with a characteristic of the transistors 201 through 206 in correspondence with the control pulse. Further, the alternating current motor can be operated by variable frequency power source by an output of the inverter 103.

An output signal of a setter 118 for setting a predetermined upper limit value of a terminal voltage of the capacitor 102 is applied to a comparator 119 having a hysteresis characteristic to thereby monitor the terminal voltage of the capacitor 102. Further, when the terminal voltage of the capacitor 2 exceeds the predetermined upper limit value in braking, an output signal $V_{COM}$ is generated from the comparator 119. The acceleration/deceleration limiting circuit 120 follows a set voltage of the frequency setter 111 by a change rate having a predetermined gradient. Further, during a speed reducing operation, an amplification factor of the voltage control circuit 121 is increased. Thereby, the pulse width of the control pulse outputted from the modulating circuit 115 is widened to thereby increase a voltage applied to the alternating current motor 104. It is proposed to increase iron loss and copper loss by increasing the terminal voltage to thereby reduce the speed of the alternating current motor 104 in a short period of time.

Further, as other related art, there is proposed an inverter apparatus of calculating a switching output by a function of always constituting the same output voltage for a direct current voltage detected by a direct current detecting circuit in an operation other than speed reducing and calculating the switching output by a function of a rated direct current voltage value of the alternating current power source in speed reducing operation. (refer to, for example, Patent Reference 2)

FIG. 11 is a block diagram showing an inverter apparatus of the related art. In the drawing, numeral 301 designates a converter circuit constituting a rectifying circuit for converting an alternating current voltage of an alternating current power source 307 into a direct current voltage, numeral 302 designates a smoothing capacitor for smoothing the direct current voltage of the converter circuit 301, numeral 303 designates an inverter circuit constituting an inversely converting circuit for converting a direct current voltage of the smoothing condenser 302 into an alternating current voltage having a predetermined frequency by making a switching element ON/OFF by a predetermined timing, numeral 304 designates a microcomputer for controlling the inverter circuit 303 by a PWM control, numeral 305 designates a base amplifier for outputting a PWM signal for driving a switching element of the inverter circuit 303, numeral 306 designates a direct current voltage detecting circuit for detecting the direct current voltage of the smoothing capacitor 302 and numeral 350 designates the inverter apparatus constituted by the converter circuit 301 through the direct current voltage detecting circuit 306. Numeral 308 designates an induction motor driven by an alternating current voltage of the inverter circuit 303, numeral 400 designates an operation command apparatus for instructing to operate the inverter apparatus 350, the operation command apparatus includes a microcomputer 421, a key sheet 422 and a display 423, and can set operation commands of regular rotation, inverse rotation, stop and an operation command of an output frequency to the inverter apparatus 350. Numeral 314 designates a microcomputer for controlling the inverter circuit 303 by a PWM control and constituted by including a switching output calculating circuit 315 for calculating switching output signals in the operation commands other than speed reducing and in the operation command in speed reducing and RAM 316 for storing the operation commands of regular rotation, inverse rotation, stop and an output frequency set by the operation command apparatus 400. Next, operation of a case of operating an induction motor will be explained in reference to a flowchart in operation of FIG. 12. First, for example, the operation command of regular rotation is inputted by the operation command apparatus 400, next, the operation of output frequency is inputted and operation is started (S11). Next, the microcomputer 421 determines whether stop or not by seeing whether stop flag is on at the microcomputer 421 of the operation command apparatus 400 (step S12). When stop is not determined, the microcomputer 314 reads the operation command of output frequency set to a predetermined frequency (step S13), when stop is determined, the microcomputer 314 reads an output frequency command of 0 Hz (step s14). Thereafter, the microcomputer 314 determines speed reducing or not by seeing whether speed reducing flag is on at the microcomputer 421 of the operation command apparatus 400 (step S15). Further, when speed reducing is not determined, the microcomputer 314 reads the direct current voltage detected by the direct current voltage detecting circuit 306 (step s16), a switching output is calculated by a function constituting a value always set with an output voltage for the direct current voltage, that is, a function of constituting always the same output voltage for the direct current voltage (step S18), the switching output is outputted to the base amplifier 305, the switching element of the inverter circuit 303 is driven by the PWM signal and an alternating current voltage of an output frequency set by the inverter circuit 303 is outputted (step S19). Here, the function constituting the same output voltage for the detected direct current voltage signifies a function of carrying out an operation of correcting the output voltage for a change in the direct current voltage so as not to vary the output voltage for a variation in the direct current voltage. Further, when speed reducing is determined, the direct current voltage value of the smoothing capacitor 302 is constituted by a direct current voltage in a rated alternating current power source voltage, for example, when the rated alternating current power source is 200 V, the direct current voltage value of the smoothing capacitor 302 is constituted by $200 \times 2^{1/2} = 283$ V as the direct current voltage value (step S17), the switching output is calculated by the function (step S18), the switching output is outputted to the base amplifier 305, the switching element of the inverter circuit 303 is driven by the PWM signal and the alternating current voltage is outputted from the inverter circuit 303 (step S19). Thereby, although the output voltage of the inverter circuit 303 in speed reducing becomes the same as the set value when the direct current voltage is constituted by a rated value, when the direct current voltage is increased by the regenerative power of the induction motor 8, the set value is increased in proportion thereto. That is, although in operation not in speed reducing but, for example, in acceleration and constant speed, even when the power source voltage of the alternating current power source 307 is varied, the output voltage of the inverter circuit 303 becomes the predetermined output voltage, in speed reducing operation, even when the direct current voltage is increased by the regenerative power, the switching output signal is calculated by the function of the direct current voltage value as the rated value 283 V which is the value lower than an actual value. As a result, the switching element of the inverter circuit 303 is driven by the direct current voltage value when the alternating current power source 307 is at the rated value regardless of the change in the direct current voltage, and therefore, the output voltage is increased in proportion to an increase in the direct current voltage. Here, the function of the direct current voltage value when the alternating current power source 307 is at the rated value signifies a function in which switching in the rated input voltage of the alternating current power source 307 is carried out even when the direct current voltage is varied and operation of correcting the output voltage is prevented from being carried out. In this way, by increasing the output voltage of the inverter circuit 303 in speed reducing, an exciting current to the induction motor 308 is increased, loss at wirings of the induction motor 308 is increased. This means that after all, the regenerative power of the inverter circuit 303 is consumed by the induction motor 308 by increasing the exciting current to the induction motor 308, the regenerative power to the inverter circuit 303 is reduced in comparison with that in the related art, also an increase in the direct current voltage is reduced. Therefore, a speed reducing function can be promoted without interrupting speed reducing operation and without being accompanied by a circuit of consuming the regenerative power by a resistor or the like. Further, it is proposed to also increase a speed reducing torque by increasing the exciting current.

Patent Reference 1: JP-A-58-165695
Patent Reference 2: JP-A-5-219771

DISCLOSURE OF THE INVENTION

Problems that the Invention is to Solve

According to the inverter apparatus of the related art, it is proposed that the terminal voltage of the alternating current motor 104 is increased by increasing the amplification factor of the voltage control circuit 121 in speed reducing operation and speed can be reduced in a short period of time by increasing iron loss and copper loss. Further, it is proposed that in speed reducing operation, even when the direct current voltage is increased by the regenerative power, the switching output signal is calculated by the function of the direct current voltage value as the rated value 283 V which is the value lower than the actual value, by increasing the output voltage, the exciting current to the induction motor 308 is increased, loss at the wirings of the induction motor 308 is increased, and therefore, the speed reducing function can be promoted, and by increasing the exciting current, also the speed reducing torque is increased. The proposals are methods of shortening a speed reducing time period by increasing loss of the alternating current motor by increasing a magnetic flux level of the alternating current motor in speed reducing. However, in recent years, an alternating current motor which is easy to be magnetically saturated is increased, when the proposed methods are used as they are, the predetermined magnetic flux level is not reached, the current flowing in the alternating current motor is rapidly increased, and there is a possibility that the current flows up to an overcurrent level of the inverter apparatus, or the alternating current motor is burned.

The invention has been carried out in view of the problem and it is an object thereof to provide a method and an apparatus capable of reducing a speed of an alternating current motor and shortening a speed reducing time period without bringing about a failure by monitoring a current flowing in the alternating current motor in driving the alternating current motor by bringing about an overexcited state in speed reducing, and when the current flowing in the alternating current motor reaches a predetermined value, by preventing the current flowing in the alternating current motor from being increased further by returning the overexcited state to a normal magnetic flux state.

MEANS FOR SOLVING THE PROBLEMS

According to the invention according to Claim 1, there is provided an inverter apparatus including: a converter portion for converting an alternating current voltage into a direct current voltage, a capacitor for smoothing the direct current voltage, an inverter portion for driving an alternating current motor by converting the direct current voltage into an alternating current, a current converting portion for generating a detecting value of a current flowing in the motor, and a PWM calculating portion for generating a signal for driving a gate of a power element, a direct current voltage detecting portion for detecting the direct current voltage, a first filter portion and a second filter portion constituting two low pass filters for filtering an output of the direct current voltage detecting portion, a speed reducing rate setting portion for setting a speed reducing time period of the motor, a speed reducing rate calculating portion for calculating a frequency of driving the motor from an output of the first filter portion and an output of the speed reducing rate setting portion, and a voltage command correcting portion for correcting a voltage command from an output of the second filter portion and a given voltage command, wherein in speed reducing, a time constant of the second filter portion is constituted by 10 through 10000 times as much as a time constant of the first filter portion.

According to the invention according to Claim 2, there is provided the inverter apparatus according to Claim 1, wherein when the current detecting value becomes equal to or larger than a predetermined value, in accordance with a magnitude of the current, the time constant of the second filter portion is gradually reduced from an initial value to the time constant of the first filter portion.

According to the invention according to Claim 3, there is provided the inverter apparatus according to Claim 1, wherein when a d-axis current detecting value calculated from the current detecting value becomes equal to or larger than a predetermined value, in accordance with a magnitude of the d-axis current, the time constant of the second filter portion is gradually reduced from the initial value in speed reducing to the time constant of the first filter portion.

According to the invention according to Claim 4, there is provided the inverter apparatus according to Claim 1, wherein when a q-axis current detecting value calculated from the current detecting value becomes equal to or larger than a predetermined value, in accordance with a magnitude of the q-axis current, the time constant of the second filter portion is gradually reduced from an initial value in speed reducing to the time constant of the first filter portion.

According to the invention according to Claim 5, there is provided the inverter apparatus according to Claim 1, wherein a previously set speed reducing time period is adjusted such that the output of the first filter portion becomes a previously set value in reducing a speed of the alternating current motor.

According to the invention according to Claim 6, there is provided a method of reducing a speed of a motor of an inverter apparatus including: a converter portion for converting an alternating current voltage into a direct current voltage, a capacitor for smoothing the direct current voltage, an inverter portion for driving an alternating current motor by converting the direct current voltage into an alternating current, a current converting portion for generating a current detecting value, and a PWM calculating portion for generating a signal for driving a gate of a power element of the inverter portion, the method including: a step of detecting the direct current voltage, a step of calculating the current detecting value, a step of filtering the direct current voltage by a first filter portion, a step of filtering the direct current voltage by a second filter portion by a time constant the same as a time constant of the first filter portion in normal operation and by a time constant larger than the time constant of the first filter portion by a multiplication factor of 10 through 10000 in speed reducing, a step of calculating a frequency of driving the motor by a speed reducing rate set by a speed reducing rate setting portion for setting a speed reducing time period of the motor and an output of the first filter portion, and a step of correcting a voltage command from an output of the second filter portion and a given voltage command.

According to the invention according to Claim 7, there is provided the method of reducing a speed of a motor of an inverter apparatus according to Claim 6, wherein when the current detecting value becomes equal to or larger than a predetermined value, in accordance with a magnitude of the current, the time constant of the second filter portion is gradually reduced from an initial value in speed reducing to the time constant of the first filter portion.

According to the invention according to Claim 8, there is provided the method of reducing a speed of a motor of an inverter apparatus according to Claim 6, wherein when a d-axis current detecting value calculated from the current detecting value becomes equal to or larger than a predetermined value, in accordance with a magnitude of the d-axis current, the time constant of the second filter portion is gradually reduced from an initial value in speed reducing to the time constant of the first filter portion.

According to the invention according to Claim 9, there is provided the method of reducing a speed of a motor of an inverter apparatus according to Claim 6, wherein when a q-axis current detecting value calculated from the current detecting value becomes equal to or larger than a predetermined value, in accordance with a magnitude of the q-axis current, the time constant of the second filter portion is gradually reduced from an initial value in speed reducing to the time constant of the first filter portion.

According to the invention according to Claim 10, there is provided the method of reducing a speed of a motor of an inverter apparatus according to Claim 6, wherein a previously set speed reducing time period is adjusted such that the voltage detecting value outputted by the first filter portion becomes a previously set value in reducing the speed of the alternating current motor.

According to the invention according to Claim 11, there is provided the inverter apparatus according to Claim 1, further including: a multiplying portion for multiplying an arbitrary voltage command by 1 in normal operation and the output of the speed reducing rate setting portion by a previously set gain in speed reducing.

According to the invention according to Claim 12, there is provided the inverter apparatus according to Claim 11, wherein when the current detecting value becomes equal to or larger than a first predetermined current value, in accordance with a magnitude of the current, the time constant of the second filter portion is gradually reduced from an initial value in speed reducing to the time constant of the first filter portion, and when the current detecting value becomes equal to or larger than a second predetermined current value, in accordance with a magnitude of the current, the gain is gradually reduced to return to 1.

According to the invention according to Claim 13, there is provided the inverter apparatus according to Claim 11, wherein when a d-axis current detecting value calculated from the current detecting value becomes equal to or larger than a predetermined value, in accordance with a magnitude of the d-axis current, the time constant of the second filter portion is gradually reduced from an initial value in speed reducing to the time constant of the first filter portion, and when the d-axis current detecting value becomes equal to or larger than a first predetermined current value, in accordance with a magnitude of the current, the gain is gradually reduced to return to 1.

According to the invention according to Claim 14, there is provided the inverter apparatus according to Claim 11, wherein when a q-axis current detecting value calculated from the current detecting value becomes equal to or larger than a predetermined value, in accordance with a magnitude of the q-axis current, the time constant of the second filter portion is gradually reduced from an initial value in speed reducing to the time constant of the first filter portion, and when the q-axis current detecting value becomes equal to or larger than a first predetermined current value, in accordance with a magnitude of the current, the gain is gradually reduced to return to 1.

According to the invention according to Claim 15, there is provided the inverter apparatus according to Claim 11, wherein a previously set speed reducing time period is adjusted such that the voltage detecting value outputted by the first filter portion becomes a previously set value in reducing the speed of the alternating current motor.

According to the invention according to Claim 16, there is provided the method of reducing a speed of a motor of an inverter apparatus according to Claim 6, further including: a step of multiplying the voltage command given by a multiplying portion by 1 in normal operation and by a previously set gain in speed reducing, and a step of correcting the voltage command from an output of the multiplying portion and an output of the second filter portion.

According to the invention according to Claim 17, there is provided the method of reducing a speed of a motor of an inverter apparatus according to Claim 16, further including: a step of gradually reducing the time constant of the second filter portion from an initial value in speed reducing to the time constant of the first filter portion in accordance with a magnitude of the current when the current detecting value becomes equal to or larger than a predetermined value, and gradually reducing the gain to return to 1 in accordance with a magnitude of the current when the current detecting value becomes equal to or larger than a first predetermined value.

According to the invention according to Claim 18, there is provided the method of reducing a speed of a motor of an inverter apparatus according to Claim 16, further including: a step of gradually reducing the time constant of the second filter portion from an initial value in speed reducing to the time constant of the first filter portion in accordance with a magnitude of a d-axis current when the d-axis current detecting value calculated from the current detecting value becomes equal to or larger than a predetermined value, and gradually reducing the gain to return to 1 in accordance with the magnitude of the current when the d-axis current detecting value becomes equal to or larger than a first predetermined value.

According to the invention according to Claim 19, there is provided the method of reducing a speed of a motor of an inverter apparatus according to Claim 16, further including: a step of gradually reducing the time constant of the first filter portion from an initial value in speed reducing to the time constant of the first filter portion in accordance with a magnitude of a q-axis current when the q axis current detecting value calculated from the current detecting value becomes equal to or larger than a predetermined value, and gradually reducing the gain to return to 1 in accordance with the magnitude of the current when the q-axis current detecting value becomes equal to or larger than a first predetermined value.

According to the invention according to Claim 20, there is provided the method of reducing a speed of a motor of an inverter apparatus according to Claim 16, further including: a step of adjusting a previously set speed reducing time period such that the voltage detecting value of the first filter portion becomes a previously set value in reducing the speed of the alternating current motor.

According to the invention according to Claim 21, there is provided the inverter apparatus according to Claim 1, wherein the time constant of the second filter portion is made to be equal to or larger than the time constant of the first filter portion in speed reducing, the frequency is reduced to a predetermined frequency while maintaining the voltage command, thereafter, the speed of the motor is reduced by a previously set rate of the frequency to the voltage.

According to the invention according to Claim 22, there is provided the inverter apparatus according to Claim 21, wherein when the current detecting value becomes equal to or larger than a predetermined value, in accordance with a magnitude of the current, the time constant of the second filter portion is reduced from an initial value in speed reducing to the time constant of the first filter portion, and when the current detecting value becomes equal to or larger than the predetermined value, in accordance with the magnitude of the current, even before the frequency is reduced to the predetermined value, the voltage command is reduced, and a rate of the frequency to the voltage is gradually returned to a rate in a normal control state.

According to the invention according to Claim 23, there is provided the inverter apparatus according to Claim 21, wherein when a d-axis current detecting value calculated from the current detecting value becomes equal to or larger than a predetermined value, in accordance with a magnitude of the d-axis current, the time constant of the second filter portion is gradually reduced from an initial value in speed reducing to the time constant of the first filter portion, and when the d-axis current detecting value becomes equal to or larger than the predetermined value, in accordance with the magnitude of the d-axis current, even before reducing the frequency to the predetermined value, the voltage command is reduced, and a rate of the frequency to the voltage is gradually returned to a rate in the normal control state.

According to the invention according to Claim 24, there is provided the inverter apparatus according to Claim 21, wherein when a q-axis current detecting value calculated from the current detecting value becomes equal to or larger than a predetermined value, in accordance with a magnitude of the q-axis current, the time constant of the second filter portion is gradually reduced from an initial value in speed reducing to the time constant of the first filter portion, and when the q-axis current detecting value becomes equal to or larger than the predetermined value, in accordance with the magnitude of the q-axis current, even before reducing the frequency to the predetermined value, the voltage command is made to be equal to or smaller than the voltage command in the normal control state, and a rate of the frequency to the voltage is gradually returned to a rate in the normal control state.

According to the invention according to Claim 25, there is provided the inverter apparatus according to Claim 21, wherein a previously set speed reducing time period is adjusted such that the voltage detecting value outputted by the first filter becomes a previously set value in reducing the speed of the alternating current motor.

According to the invention according to Claim 26, there is provided the method of reducing the speed of a motor of an inverter apparatus according to Claim 6, further including: a step of reducing only the frequency while maintaining only the voltage command, and reducing the speed of the motor by a rate set with the frequency and the voltage when the frequency is reduced to a predetermined frequency.

According to the invention according to Claim 27, there is provided the method of reducing a speed of a motor of an inverter apparatus according to Claim 26, further including: a step of gradually reducing the time constant of the second filter portion from an initial value in speed reducing to the time constant of the first filter portion in accordance with a magnitude of the current when the current detecting value becomes equal to or larger than a predetermined value and also making the voltage command equal to or smaller than the voltage command in the normal control state, and gradually returning a rate of the frequency to the Voltage to a rate in the normal control state even before reducing the frequency to the predetermined value in accordance with the magnitude of the current when the current detecting value becomes equal to or larger than the predetermined value.

According to the invention according to Claim 28, there is provided the method of reducing a speed of a motor of an inverter apparatus according to Claim 26, further including: a step of gradually reducing the time constant of the second filter portion from an initial value in speed reducing to the time constant of the first filter portion in accordance with a magnitude of a d-axis current when the d-axis current detecting value calculated from the current detecting value becomes equal to or larger than a predetermined value and making the voltage command equal to or smaller than the voltage command in the normal operating state, and gradually returning a rate of the frequency to the voltage to a rate in the normal control state even before reducing the frequency to the predetermined value in accordance with the magnitude of the d-axis current when the d-axis current detecting value becomes equal to or larger than the predetermined value.

According to the invention according to Claim 29, there is provided the method of reducing a speed of a motor of an inverter apparatus according to Claim 16, further including: a step of gradually reducing the time constant of the second filter portion from an initial value in speed reducing to the time constant of the first filter portion in accordance with a magnitude of the q-axis current when the q-axis current detecting value calculated from the current detecting value becomes equal to or larger than a predetermined value and making the voltage command equal to or smaller than the voltage command in the normal operating state, and gradually returning a rate of the frequency to the voltage to a rate in the normal control state even before reducing the frequency to the predetermined value in accordance with the magnitude of the q-axis current when the q-axis current detecting value becomes equal to or larger than the predetermined value.

According to the invention according to Claim 30, there is provided the method of reducing a speed of a motor of an inverter apparatus according to Claim 26, further including: a step of adjusting a previously set speed reducing time period such that the voltage detecting value outputted by the first filter portion becomes a previously set value in reducing the speed of the alternating current motor.

EFFECT OF THE INVENTION

According to the invention, the frequency of driving the motor is calculated by using the detected value constituted by passing the direct current bus line voltage through the first filter portion, the voltage command is corrected by using the detected value passing the second filter portion, further, the time constant of the second filter portion is made to be larger than the time constant of the first filter portion in speed reducing, thereby, the motor is brought into the overexcited state, loss is brought about in the motor, and the speed can be reduced by a short time period by also preventing the overcurrent.

According to the invention according to Claim 1, the speed is reduced in the overexcited state by making the time constant of the second filter portion larger than the time constant of the first filter portion in speed reducing and therefore, the inverter apparatus capable of reducing the speed by the time period shorter than that in reducing the speed at the normal magnetic flux level can be provided.

According to the invention according to Claim 2, when the current detecting value flowing in the alternating current motor becomes equal to or larger than the predetermined value, in accordance with the magnitude of the current, the time constant of the second filter portion is adjusted, and therefore, even in the case of the alternating current motor which is easy to be saturated magnetically, the inverter apparatus capable of reducing the speed without stopping the inverter by the overcurrent or burning the alternating current motor can be provided.

According to the invention according to Claim 3, when the d-axis current detecting value becomes equal to or larger than the predetermined value, in accordance with the magnitude of the d-axis current, the time constant of the second filter portion is adjusted, and therefore, even in the case of the alternating current motor which is easy to be saturated magnetically, the inverter apparatus capable of reducing the speed without stopping the inverter by the overcurrent or burning the alternating current motor can be provided.

According to the invention according to Claim 4, when the q-axis current detecting value becomes equal to or larger than the predetermined value, in accordance with the magnitude of the q-axis current, the time constant of the second filter portion is adjusted, and therefore, even in the case of the alternating current motor which is easy to be saturated magnetically, the inverter apparatus capable of reducing the speed without stopping the inverter by the overcurrent or burning the alternating current motor can be provided.

According to the invention according to Claim 5, in reducing the speed of the alternating current motor, the previously set speed reducing time period is adjusted such that the voltage detecting value outputted by the first filter portion becomes the previously set value, and therefore, in reducing the speed, the overexcited state can always be maintained, and therefore, the inverter apparatus capable of reducing the speed by the time period shorter than that in the normal magnetic flux level can be provided.

According to the invention according to Claim 6, in reducing the speed, the speed is reduced in the overexcited state by making the time constant of the second filter portion larger than the time constant of the first filter portion, and therefore, the speed can be reduced by the time period shorter than that in the normal magnetic flux level.

According to the invention according to Claim 7, when the current detecting value becomes equal to or larger than the predetermined value, in accordance with the magnitude of the current, the time constant of the second filter portion is adjusted, and therefore, even in the case of the alternating current motor which is easy to be saturated magnetically, the speed can be reduced without stopping the inverter by the overcurrent or burning the alternating current motor.

According to the invention according to Claim 8, when the d-axis current detecting value becomes equal to or larger than the predetermined value, in accordance with the magnitude of the d-axis current, the time constant of the second filter portion is adjusted, and therefore, even in the case of the alternating current motor which is easy to be saturated magnetically, the speed can be reduced to stop the motor without stopping the inverter by the overcurrent or burning the alternating current motor.

According to the invention according to Claim 9, when the q-axis current detecting value becomes equal to or larger than the predetermined value, in accordance with the magnitude of the q-axis current, the time constant of the second filter portion is adjusted, and therefore, even in the case of the alternating current motor which is easy to be saturated magnetically, the speed can be reduced to stop the motor without stopping the inverter by the overcurrent or burning the alternating current motor.

According to the invention according to Claim 10, the previously set speed reducing time period is adjusted such that the voltage detecting value outputted by the first filter portion becomes the previously set value in reducing the speed of the alternating current motor, and therefore, the overexcited state can always be maintained in reducing the speed, and therefore, the speed can be reduced by the time period shorter than that in the normal magnetic flux level.

According to the invention according to Claim 11, the speed is reduced in the overexcited state by making the time constant of the second filter portion larger than the time constant of the first filter portion larger than the time constant of the first filter and multiplying the given voltage command by the set gain simultaneously therewith in reducing the speed, and therefore, the inverter apparatus capable of reducing the speed by the time period shorter than that in the normal magnetic flux level can be provided.

According to the invention according to Claim 12, in accordance with the magnitude of the current detecting value, the time constant of the second filter portion is adjusted or the gain is adjusted or both thereof are adjusted, and therefore, even in the case of the alternating current motor which is easy to be saturated magnetically, the inverter apparatus capable of reducing the speed without stopping the inverter by the overcurrent or burning the alternating current motor can be provided.

According to the invention according to Claim 13, in accordance with the magnitude of the d-axis current detecting value, the time constant of the second filter portion is adjusted or the gain is adjusted or the both are adjusted, and therefore, even in the case of the alternating current motor which is easy to be saturated magnetically, the inverter apparatus capable of reducing the speed without stopping the inverter by the overcurrent or burning the alternating current motor can provided.

According to the invention according to Claim 14, in accordance with the magnitude of the q-axis current detecting value, the time constant of the second filter portion is adjusted or the gain is adjusted or the both are adjusted, and therefore, even in the case of the alternating current motor which is easy to be saturated magnetically, the inverter apparatus capable of reducing the speed without stopping the inverter by the overcurrent or burning the alternating current motor can provided.

According to the invention according to Claim 15, the previously set speed reducing time period is adjusted such that the voltage detecting value outputted by the first filter becomes the previously set value in reducing the speed of the alternating current motor, and therefore, the overexcited state can always be maintained in reducing the speed, and therefore, the inverter apparatus capable of reducing the speed by the time period shorter than that in the normal magnetic flux level can be provided.

According to the invention according to Claim 16, the speed is reduced in the overexcited state by making the time constant of the second filter portion larger than the time constant of the first filter portion and multiplying the given voltage command by the set gain in reducing the speed, and therefore, the speed can be reduced by the time period shorter than that in the normal magnetic flux level.

According to the invention according to Claim 17, in accordance with the magnitude of the current detecting value, the time constant of the second filter portion is adjusted or the gain is adjusted or the both are adjusted, and therefore, even in the case of the alternating current motor which is easy to be saturated magnetically, the speed can be reduced without stopping the inverter by the overcurrent or burning the alternating current motor.

According to the invention according to Claim 18, in accordance with the magnitude of the d-axis current detecting value, the time constant of the second filter portion is adjusted or the gain is adjusted or the both are adjusted, and therefore, even in the case of the alternating current motor which is easy to be saturated magnetically, the speed can be reduced without stopping the inverter by the overcurrent or burning the alternating current motor.

According to the invention according to Claim 19, in accordance with the magnitude of the q-axis current detecting value, the time constant of the second filter portion is adjusted or the gain is adjusted or the both are adjusted, and therefore, even in the case of the alternating current motor which is easy to be saturated magnetically, the speed can be reduced without stopping the inverter by the overcurrent or burning the alternating current motor.

According to the invention according to Claim 20, the previously set speed reducing time period is adjusted such that the voltage detecting value outputted by the first filter portion becomes the previously set value in reducing the speed of the alternating current motor, and therefore, the overexcited state can always be maintained in reducing the speed, and therefore, the speed can be reduced by the time period shorter than that in the normal magnetic flux level.

According to the invention according to Claim 21, when the frequency is reduced to the predetermined frequency by making the time constant of the second filter portion larger than the time constant of the first filter portion and reducing only the frequency while maintaining only the voltage command in the frequency and the voltage command outputted when the speed reducing command is inputted simultaneously therewith in reducing the speed, the speed is reduced in the overexcited state by reducing the speed by the rate set with the frequency and the voltage, and therefore, the inverter apparatus capable of reducing the speed by the time period shorter than that in the normal magnetic flux level can be provided.

According to the invention according to Claim 22, when in accordance with the magnitude of the current detecting value, the time constant of the second filter portion is made to be short, also the time constant of the first filter is changed or the current detecting value becomes equal to or lager than the predetermined value, in accordance with the magnitude of the current, even before reducing the frequency to the predetermined value, also the voltage command is reduced, the rate of the frequency to the voltage is returned to the rate in the normal control state or the both are carried out, and therefore, even in the case of the alternating current motor which is easy to be saturated magnetically, the inverter apparatus capable of reducing the speed without stopping the inverter by the overcurrent or burning the alternating current motor can be provided.

According to the invention according to Claim 23, when in accordance with the magnitude of the d-axis current detecting value, the time constant of the second filter portion is made to be short, also the time constant of the first filter portion is changed or the current detecting value becomes equal to or larger than the predetermined value, in accordance with the magnitude of the current, even before reducing the frequency to the predetermined value, also the voltage command is reduced, the rate of the frequency to the voltage is returned to the rate in the normal control state or the both are carried out, and therefore, even in the case of the alternating current motor which is easy to be saturated magnetically, the inverter apparatus capable of reducing the speed without stopping the inverter by the overcurrent or burning the alternating current motor can be provided.

According to the invention according to Claim 24, when in accordance with the magnitude of the q-axis current detecting value, the time constant of the second filter portion is made to be short, also the time constant of the first filter portion is changed or the current detecting value becomes equal to or larger than the predetermined value, in accordance with the magnitude of the current, even before reducing the frequency to the predetermined value, also the voltage command is reduced, the rate of the frequency to the voltage is returned to the rate in the normal control state or the both are carried out, and therefore, even in the case of the alternating current motor which is easy to be saturated magnetically, the inverter apparatus capable of reducing the speed without stopping the inverter by the overcurrent or burning the alternating current motor can be provided.

According to the invention according to Claim 25, the previously set speed reducing time period is adjusted such that the voltage detecting value outputted by the first filter becomes the previously set value in reducing the speed of the alternating current motor, and therefore, the overexcited state can always be maintained in reducing the speed, and therefore, the inverter apparatus capable of reducing the speed by the time period shorter than that in the normal magnetic flux level can be provided.

According to the invention according to Claim 26, when the speed is reduced to the predetermined frequency by making the time constant of the second filter portion larger than the time constant of the first filter portion and reducing only the frequency while maintaining only the voltage command in the frequency and the voltage command outputted when the speed reducing command is inputted simultaneously therewith, the speed is reduced in the overexcited state by reducing the speed by the rate set with the frequency and the voltage, and therefore, the inverter apparatus reducing the speed by the time period shorter than that in the normal magnetic flux level can be provided.

According to the invention according to Claim 27, when in accordance with the magnitude of the current detecting value, the time constant of the second filter portion is made to be short, also the time constant of the first filter is changed or the current detecting value becomes equal to or larger than the predetermined value, in accordance with the magnitude of the current, even before reducing the frequency to the predetermined value, also the voltage command is reduced, the rate of the frequency and the voltage is returned to the rate in the normal control state or the both are carried out, and therefore, even in the case of the alternating current motor which is easy to be saturated magnetically, the speed can be reduced without stopping the inverter by the overcurrent or burning the alternating current motor.

According to the invention according to Claim 28, when in accordance with the magnitude of the d-axis current detecting value, the time constant of the second filter portion is made to be short, also the time constant of the first filter is changed or the current detecting value becomes equal to or larger than the predetermined value, in accordance with the magnitude of the current, even before reducing the frequency to the predetermined value, also the voltage command is reduced, the rate of the frequency and the voltage is returned to the rate in the normal control state or the both are carried out, and therefore, even in the case of the alternating current motor which is easy to be saturated magnetically, the speed can be reduced without stopping the inverter by the overcurrent or burning the alternating current motor.

According to the invention according to Claim 29, when in accordance with the magnitude of the q-axis current detecting value, the time constant of the second filter portion is made to be short, also the time constant of the first filter is changed or the current detecting value becomes equal to or larger than the predetermined value, in accordance with the magnitude of the current, even before reducing the frequency to the predetermined value, also the voltage command is reduced, the rate of the frequency and the voltage is returned to the rate in the normal control state or the both are carried out, and therefore, even in the case of the alternating current motor which is easy to be saturated magnetically, the inverter apparatus reducing the speed without stopping the inverter by the overcurrent or burning the alternating current motor can be provided.

According to the invention according to Claim 30, the previously set speed reducing time period is adjusted such that the voltage detecting value outputted by the first filter becomes the previously set value in reducing the speed of the alternating current motor, and therefore, the overexcited state can always be maintained in reducing the speed, and therefore, the speed can be reduced by the time period shorter than that in the normal magnetic flux level.

DESCRIPTION OF REFERENCE NUMERALS AND SIGNS

Figure 1:
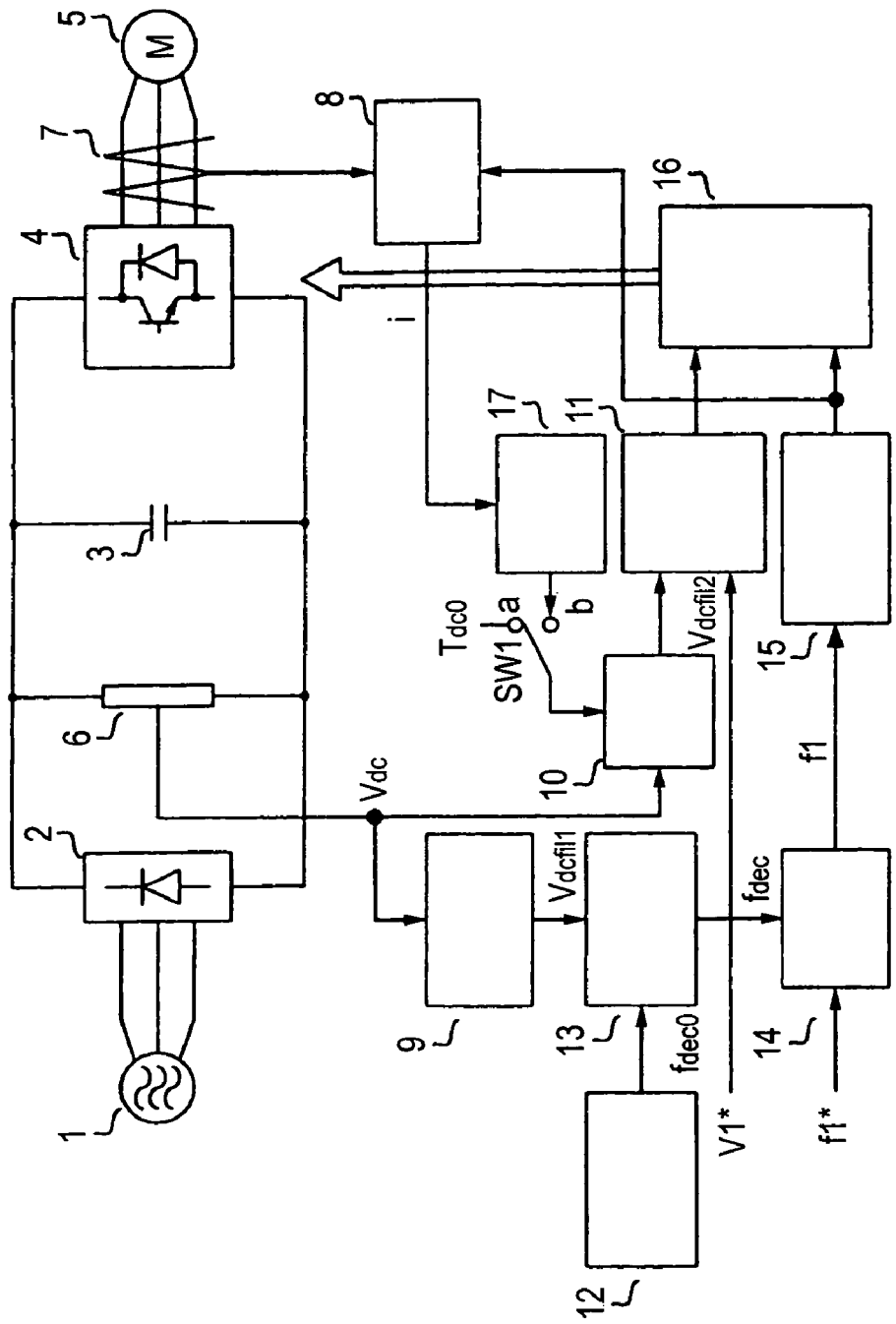
FIG. 1 is a block diagram of a first embodiment of an inverter apparatus to which a method of the invention is applied.

1 alternating current power source
2 converter portion
3, 102 capacitors
4, 103 inverter portions
5 alternating current motor
6 direct current bus line voltage detecting portion
7 current detector
8 current converting portion
9 first filter portion
10 second filter portion
11 voltage command correcting portion
12 speed reducing rate setting portion 13 speed reducing rate calculating portion
14 SFS
15 frequency/phase converting portion
16 PWM calculating portion
17 time constant adjusting portion
18 PI control portion
19 multiplying portion
20 gain adjusting portion
21 voltage command adjusting portion
22 voltage command holding portion
23 voltage command reducing amount calculating portion
24 limit portion
SW1, SW2, SW3 switches
101 rectifying portion
104 alternating current motor
111 frequency setter
114 voltage/frequency converting circuit
115 modulating circuit
116 base drive circuit
118 setter
119 comparator
120 acceleration/deceleration limiting circuit
121 voltage control circuit
201 through 206 transistors
301 converter circuit
302 smoothing capacitor
303 inverter circuit
304, 314, 421 microcomputers
305 base amplifier
306 direct current voltage detecting circuit
308 induction motor
315 switching output calculating circuit
316 RAM
350 inverter apparatus
400 operation command apparatus
422 key sheet
423 display

BEST MODE FOR CARRYING OUT THE INVENTION

Specific embodiments of a method of the invention will be explained in reference to the drawings as follows.

Embodiment 1

Figure 2:
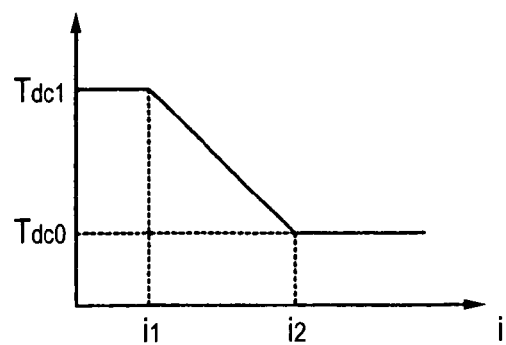
FIG. 2 shows an example of a time constant adjusting portion.
Figure 3:
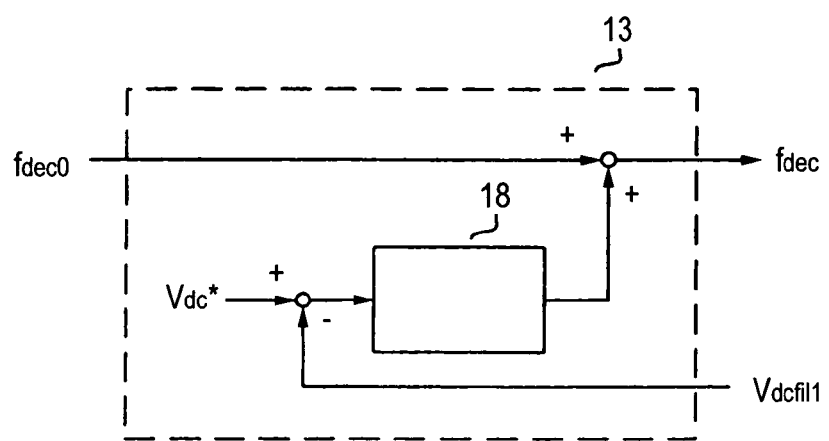
FIG. 3 shows an example of a speed reducing rate calculating portion.

FIG. 1 is a block diagram of a first embodiment of an inverter apparatus to which a method of the invention is applied, FIG. 2 shows an example of a time constant adjusting portion, FIG. 3 shows an example of a speed reducing rate calculating portion. A control apparatus of an induction motor according to the embodiment includes an alternating current power source 1, a converter portion 2, a capacitor 3, an inverter portion 4, an alternating current motor 5, a direct current bus line voltage detecting portion 6, a current detector 7, a current converting portion 8, a first filter portion 9, a second filter portion 10, a voltage command correcting portion 11, a speed reducing rate setting portion 12, a speed reducing rate calculating portion 13, SFS 14, a frequency/phase converting portion 15, a PWM calculating portion 16, a time constant adjusting portion 17 and a switch SW1. The converter portion 2 of the inverter apparatus rectifies an alternating current voltage of the alternating current power source 1 to thereby convert into a direct current voltage. The capacitor 3 smoothes the direct current voltage converted by the converter portion 2. The inverter portion 4 converts the direct current into an alternating current having an arbitrary frequency and an arbitrary voltage by controlling a power element by a PWM control to supply to the alternating current motor 5. The direct current bus line voltage detecting portion 6 detects a direct current bus line voltage $V_{dc}$ applied across both ends of the capacitor 3. The current detector 7 detects a current supplied to the alternating current motor 5. The current converting portion 8 divides the current detected by the current detector 7 into a current i1 flowing in the alternating current motor and a torque current detecting value iq and an exciting current detecting value id. The first filter portion 9 outputs the direct current bus line voltage $V_{dc}$ detected by the direct current bus line voltage detecting portion 6 as a direct current bus line voltage detecting value $V_{dcfil1}$ which has passed through a first order lag filter having a time constant $T_{dc0}$. The second filter portion 10 outputs the direct current bus line voltage $V_{dc}$ detected by the direct current bus line voltage detecting portion 6 as a direct current bus line voltage correcting value $V_{dcfil2}$ which has passed through a first order lag filter having a time constant $T_{dc}$. The voltage command correcting portion 11 calculates a voltage command correcting value from the direct current bus line correcting value $V_{dcfil2}$ such that an arbitrary voltage command V1* and an output voltage of the inverter portion 4 coincide with each other. The speed reducing rate setting portion 12 is means for setting a speed reducing time period until stopping the alternating current motor from a maximum rotational number by a constant or a voltage signal or the like. The speed reducing rate calculating portion 13 is means for calculating an optimum speed reducing rate $f_{dc}$ from a speed reducing rate $f_{dc0}$ set by the speed reducing rate setting portion 12 such that the direct current bus line voltage detecting value $V_{dcfil1}$ is maintained constant. SFS14 is means for outputting an output frequency f1 in accordance with an acceleration rate previously set with a frequency command f1* by an acceleration time setting means, not illustrated, or a deceleration rate calculated by the deceleration rate calculating portion 13. The frequency/phase converting portion 15 calculates a voltage phase by inputting the output frequency f1 outputted from the SFS14. The PWM calculating portion 16 calculates a PWM signal from the voltage command correcting value from the voltage command correcting portion 11 and the voltage phase from the frequency/phase converting portion 15. The power element of the inverter portion 4 is driven by the PWM signal outputted from the PWM calculating portion 16. The time constant adjusting portion 17 adjusts the time constant $T_{dc}$ used in the second filter portion 10 in accordance with a magnitude of the current flowing in the alternating current motor 5. FIG. 2 shows an embodiment of the time constant adjusting portion 17 showing a relationship between the current at the abscissa and the filter time constant of the second filter portion 10 at the ordinate. The time constant used in the second filter portion 10 is calculated in accordance with the magnitude of the current inputted to the time constant calculating portion 17 and a specific operation thereof will be described later. FIG. 3 shows an embodiment of the speed reducing rate calculating portion 13 for calculating the optimum speed reducing rate $f_{dec}$ by calculating a speed reducing rate correcting value $f_{deccmp}$ by a PI control portion 18 such that a direct current bus line voltage command value $V_{dc}$* and the direct current bus line voltage detecting value $V_{dcfil1}$ coincide with each other in previously set deceleration, and adding the speed reducing rate $f_{dec0}$ set by the speed reducing rate setting portion 12 and the speed reducing rate correcting value $f_{deccmp}$.

A specific explanation will be given of an operation of a case of shifting from a normal operating state to a speed reducing state according to the invention. First, in a normal control state, SW1 is on a side, the second filter portion 10 is operated by the previously set filter constant $T_{dc0}$, and therefore, the output voltage of the inverter portion 4 coincides with the voltage command value V1*. When a speed reducing command is inputted, SW1 is switched to b side. At this occasion, the filter time constant becomes a time constant of $T_{dc1}$ which is far longer than $T_{dc0}$. Therefore, in speed reducing, the direct current bus line voltage correcting value $V_{dcfil2}$ outputted by the second filter portion 10 is maintained at a value in starting to decelerate. Actually, the direct current bus line voltage is increased by reducing speed, and therefore, the voltage command correcting portion 11 is not operated correctly and calculates a voltage command correcting value to output an output voltage larger than an arbitrary voltage command. Thereby, the alternating current motor 5 is brought into an overexcited state, and therefore, iron loss or copper loss or the like at the alternating current motor 5 is increased, and therefore, a regenerative power returning to a side of the inverter apparatus is reduced, the inverter apparatus is difficult to be brought into an overvoltage state, and the speed reducing time period can be made to be shorter than in a normal magnetic flux level. When some degree of a time period has elapsed after starting deceleration, the direct current bus line voltage correcting value $V_{dcfil2}$ outputted by the second filter portion 10 becomes gradually proximate to a true value, and therefore, the voltage command correcting portion is made to be gradually operated correctly. When a load inertia of the alternating current motor 5 is large, the direct current bus line voltage correcting value $V_{dcfil2}$ becomes the true value before being decelerated to stop, however, the larger the speed, the larger the rotational energy provided to the alternating current motor 5, and the energy is reduced when the speed is reduced. Therefore, by constituting the filter time constant by $T_{dc1}$ in starting to decelerate, the overexcited state can be brought about when the speed is high, and therefore, even when the direct current bus line voltage correcting value $V_{dcfil}$ becomes gradually the true value, an effect of capable of shortening the deceleration time period is considerable.

On the other hand, in recent years, the alternating current motor 5 which is easy to be saturated magnetically is increased, even when the overexcited state is intended to bring about, the motor is magnetically saturated, only the current flows and the magnetic flux cannot be increased further. When the inverter apparatus of the related art 2 is applied to the alternating current motor which is easy to be saturated magnetically, the motor is controlled by setting 283 V in deceleration, and therefore, when the alternating current motor 5 is magnetically saturated, an excessively large current flows in the alternating current motor 5, and there is a possibility of making the invert apparatus abnormal by the overcurrent, or the alternating current motor 5 is burned by the current. Hence, according to the invention, as shown by FIG. 2, in accordance with the current i1 flowing in the alternating current motor 5, until i1 becomes $i1_1$, the filter time constant $T_{dc}$ of the second filter portion is set to $T_{dc1}$ which is far longer than the filter time constant $T_{dc0}$ of the first filter portion by a multiplication factor of about 10 through 10000, when exceeding $i1_1$, the filter time constant is gradually shortened, when $i1_2$ is reached, the direct bus line voltage correcting value $V_{dcfil2}$ is swiftly proximate to the true value by adjusting the time constant to a value the same as the filter time constant $T_{dc0}$ of the first filter portion 9, and therefore, the state is returned from the overexcited state to the normal magnetic flux state. By previously setting $i1_1$ and $i1_2$ from a characteristic of the inverter apparatus and a characteristic of the alternating current motor, even in the case of the alternating current motor which is easy to be saturated magnetically, the speed reducing time period can be shortened without a concern of making the inverter apparatus abnormal by the overcurrent or burning the alternating current motor 5. Further, a similar effect is achieved when the filter time constant of the second filter portion 10 is not adjusted in accordance with the current i1 flowing in the alternating current motor 5 but the filter time constant of the second filter portion 10 is adjusted in accordance with the torque current detecting value iq or the excited current detecting value id.

Further, although normally, when the alternating current motor 5 is decelerated, the motor is decelerated in accordance with the deceleration rate $f_{dec0}$ set by the speed reducing rate setting portion 12, when the load inertia of the alternating current motor 5 is large as explained above, the higher the speed, the larger the rotational energy provided to the alternating current motor 5, when the speed is reduced, the energy is reduced, and therefore, in starting to decelerate the motor, the direct current bus line voltage is increased considerably, however, when the speed is reduced, the direct current bus line voltage is less increased, and when the loss of the alternating current motor 5 is increased, the direct current bus line voltage is not increased. The effect of bringing the motor into the overexcited state by increasing the filter time constant of the second filter portion 10 is lost. Hence, according to the invention, as shown by FIG. 3, the direct current bus line voltage command value $V_{dc}*$ in deceleration is previously set, by adjusting the speed reducing rate such that the direct current bus line voltage detecting value $V_{dcfil1}$ outputted from the first filter portion 9 coincides with the direct current bus line voltage command value $V_{dc}*$, the direct current bus line voltage can be maintained always at the direct current bus line voltage command value $V_{dc}*$, and therefore, the overexcited state can always be maintained, and therefore, the alternating current motor 5 can be decelerated by a time period as short as possible.

Embodiment 2

Figure 4:
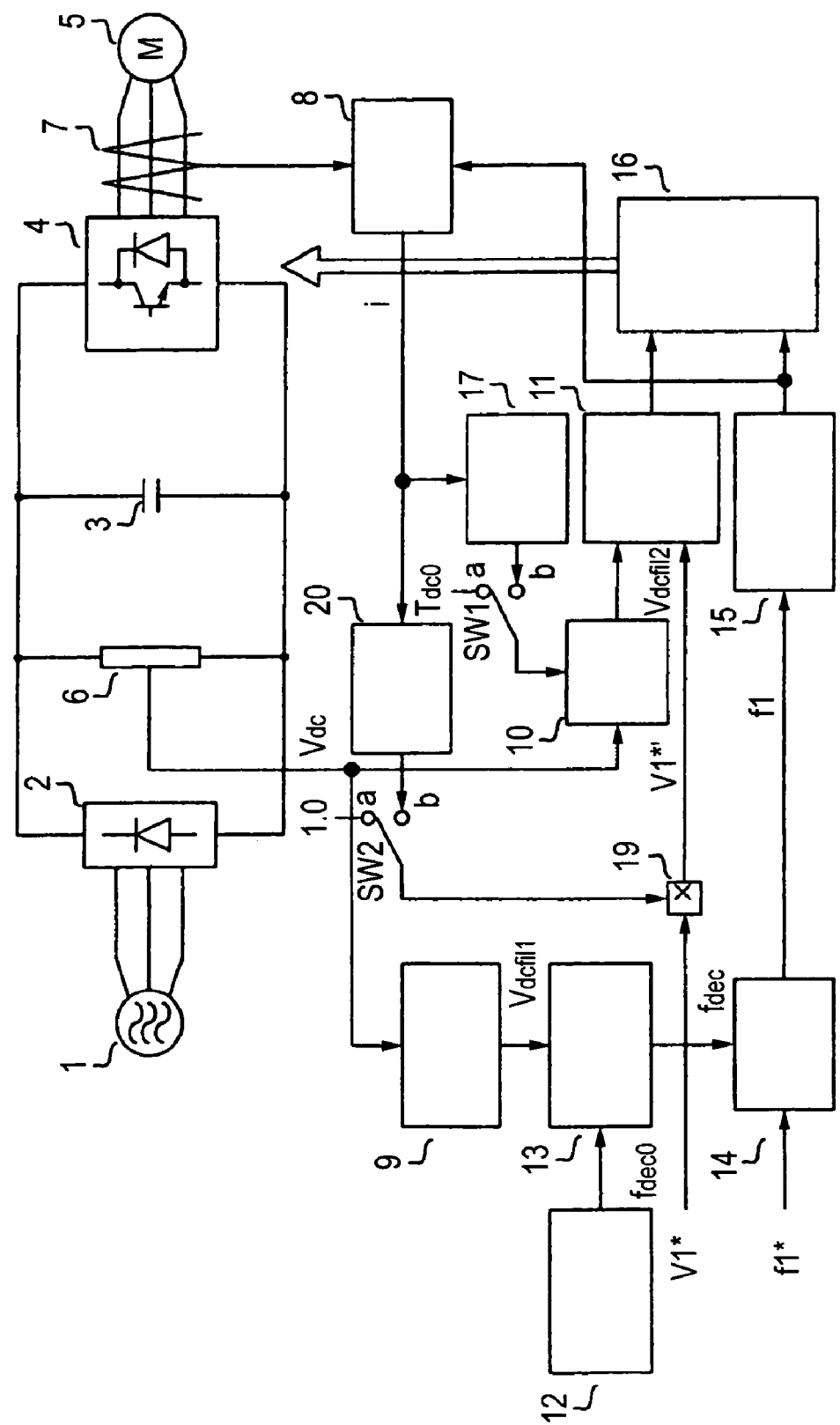
FIG. 4 is a block diagram of a second embodiment of an inverter apparatus to which a method of the invention is applied.
Figure 5:
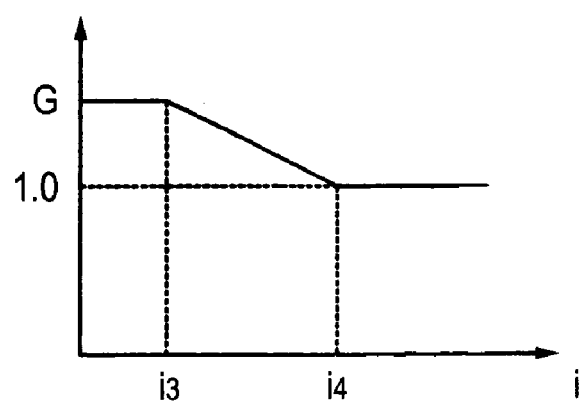
FIG. 5 shows an example of a gain adjusting portion.

FIG. 4 is a block diagram of a second embodiment of an inverter apparatus to which a method of the invention is applied, FIG. 5 shows an example of a gain adjusting portion. A control apparatus of an induction motor according to the embodiment includes the alternating current power source 1, the converter portion 2, the capacitor 3, the inverter portion 4, the alternating current motor 5, the direct current bus line voltage detecting portion 6, the current detector 7, the current converting portion 8, the first filter portion 9, the second filter portion 10, the voltage command correcting portion 11, the speed reducing rate setting portion 12, the speed reducing rate calculating portion 13, SFS 14, the frequency/phase converting portion 15, the PWM calculating portion 16, the time constant adjusting portion 17, a multiplying portion 19, a gain adjusting portion 20 and switches SW1 and SW2. The converter portion 2 of the inverter apparatus rectifies the alternating current voltage of the alternating current power source 1 to thereby convert into the direct current voltage. The capacitor 3 smoothes the direct current voltage converted by the converter portion 2. The inverter portion 4 converts the direct current into the alternating current having an arbitrary frequency and an arbitrary voltage by controlling the power element by the PWM control to supply to the alternating current motor 5. The direct current bus line voltage detecting portion 6 detects the direct current bus line voltage $V_{dc}$ applied across both ends of the capacitor 3. The current detector 7 detects the current supplied to the alternating current motor 5. The current converting portion 8 divides the current detected by the current detector 7 into the current i1 flowing in the alternating current motor and the torque current detecting value iq and the excited current detecting value id. The first filter portion 9 outputs the direct current bus line voltage $V_{dc}$ detected by the direct current bus line voltage detecting portion 6 as the direct current bus line voltage detecting value $V_{dcfil1}$ which has passed through the first order lag filter having the time constant $T_{dc0}$. The second filter portion 10 outputs the direct current bus line voltage $V_{dc}$ detected by the direct current bus line voltage detecting portion 6 as the direct current bus line voltage correcting value $V_{dcfil2}$ which has passed through the first order lag filter having the time constant $T_{dc}$. The gain adjusting portion 20 adjusts a gain G in accordance with a magnitude of the current flowing in the alternating current motor 5. The multiplying portion 19 multiplies the arbitrary voltage command V1* by the gain G and outputs a voltage command V1*' after adjustment. The voltage command correcting portion 11 calculates the voltage command correcting value from the direct current bus line voltage correcting value $V_{dcfil2}$ such that the voltage command V1*' after adjustment and the output voltage of the inverter portion 4 coincide with each other. The speed reducing rate setting portion 12 is means for setting the speed reducing time period until stopping the alternating current motor from the maximum rotational number by a constant or a voltage signal or the like. The speed reducing rate calculating portion 13 is means for calculating the optimum speed reducing rate $f_{dec}$ from the speed reducing rate $f_{dec0}$ set by the speed reducing rate setting portion 12 such that the direct current bus line voltage detecting value $V_{dcfil1}$ is maintained constant. SFS14 is means for outputting the output frequency f1 in accordance with an acceleration rate previously set with the frequency command f1* by the acceleration time setting means, not illustrated, or a deceleration rate calculated by the speed reducing rate calculating portion 13. The frequency/phase converting portion 15 calculates the voltage phase by inputting the output frequency f1 outputted from the SFS14. The PWM calculating portion 16 calculates the PWM signal from the voltage command correcting value from the voltage command correcting portion 11 and the voltage phase from the frequency/phase converting portion 15. The power element of the inverter portion 4 is driven by the PWM signal outputted from the PWM calculating portion 16. FIG. 5 shows an embodiment of the gain adjusting portion 20 showing a relationship between the current at the abscissa and the gain G at the ordinate. The gain G is calculated in accordance with the magnitude of the current inputted to the gain adjusting portion 20 and a specific operation thereof will be described later.

A specific explanation will be given of an operation in a case of shifting from the normal operating state to the speed reducing state according to the invention. First, in the normal control state, SW2 is on a side, the gain G is 1.0, and therefore, the arbitrary voltage command V1* and the voltage command V1*' after adjustment coincide with each other, at the same time, SW1 is on a side, the filter time constant of the second filter portion is operated by the filter time constant $T_{dc0}$ the same as the filter time constant of the first filter portion, and therefore, the output voltage of the inverter portion 4 coincides with the voltage command value V1*. When the speed reducing command is inputted, SW1 and SW2 are switched to b sides. At this occasion, the gain G is previously set and sets to a value larger than 1.0 within a range of 1.0 through 2.0, and therefore, the voltage command V1*' after adjustment becomes larger than the arbitrary voltage command V1* by an amount of the gain G. Further, the filter time constant of the second filter portion becomes the time constant $T_{dc1}$ far longer than $T_{dc0}$ by a multiplication factor of about 10 through 10000. Therefore, in speed reducing, the direct current bus line voltage correcting value $V_{dcfil2}$ outputted by the second filter portion 10 is maintained at the value in starting to decelerate. Actually, the direct current bus line voltage is increased by reducing the speed, and therefore, the voltage command correcting portion 11 is not operated correctly and the voltage command correcting value is calculated to output the output voltage larger than the voltage command V1*' after adjustment. Thereby, the alternating current motor 5 is brought into an overexcited state, and therefore, iron loss or copper loss or the like at the alternating current motor 5 is increased, and therefore, the regenerative power returning to a side of the inverter apparatus is reduced, the inverter apparatus is difficult to be brought into the overvoltage state, and the speed reducing time period can be made to be shorter than that in the normal magnetic flux level. When some degree of a time period has elapsed after starting to decelerate the speed, the direct current bus line voltage correcting value $V_{dcfil2}$ outputted by the second filter portion 10 becomes gradually proximate to the true value, and therefore, the voltage command correcting portion 11 is made to be gradually operated correctly.

On the other hand, in recent years, the alternating current motor 5 which is easy to be saturated magnetically is increased, even when the overexcited state is intended to be brought about, the motor is magnetically saturated, only the current flows and the magnetic flux is not increased further. When the inverter apparatus of the related art 2 is applied to the alternating current motor which is easy to be saturated magnetically, in speed reducing, the inverter apparatus is controlled by setting 283 V, and therefore, when the alternating current motor 5 is magnetically saturated, an excessively large current flows in the alternating current motor 5, and there is a possibility of making the inverter apparatus abnormal by the overcurrent, or burning the alternating current motor 5 by the current. Hence, according to the invention, as shown by FIG. 2, in accordance with the current i1 flowing in the alternating current motor 5, until i1 becomes $i1_1$, the filter time constant $T_{dc}$ of the second filter portion is set to $T_{dc1}$ far longer than the filter time constant $T_{dc0}$ of the first filter portion by a multiplication factor of about 10 through 10000, when exceeding $i1_1$, the filter time constant is gradually shortened, when $i1_2$ is reached, the direct current bus line voltage correcting value $V_{dcfil2}$ becomes swiftly proximate to the true value by adjusting the filter time constant to a value the same as the filter time constant $T_{dc0}$ of the first filter portion 9, and therefore, the state returns from the overexcited state to the normal magnetic flux state. By previously setting $i1_1$ and $i1_2$ from a characteristic of the inverter apparatus and a characteristic of the alternating current motor, even in the case of the alternating current motor which is easy to be saturated magnetically, the speed reducing time period can be shortened without a concern of making the inverter apparatus abnormal by the overcurrent or burning the alternating current motor 5. Further, even when the filter time constant of the second filter portion 10 is not adjusted in accordance with the current i1 flowing in the alternating current motor 5 but the time constant of the second filter portion 10 is adjusted in accordance with the torque current detecting value iq or the excited current detecting value id, a similar effect is achieved. Or, as shown by FIG. 5, in accordance with the current i1 flowing in the alternating current motor 5, until i1 becomes $i1_3$, the gain is set to a value larger than 1.0 which is previously set, when exceeding $i1_3$, the gain is reduced gradually, when $i1_4$ is reached, the gain is returned to 1.0. Thereby, the stage returns to the normal magnetic flux state from the overexcited state.

By previously setting $i1_3$ and $i1_4$ from the characteristic of the inverter apparatus and the characteristic of the alternating current motor, even in the case of the alternating current motor which is easy to be saturated magnetically, the speed reducing time period can be shortened without a concern of making the inverter apparatus abnormal by the overcurrent or burning the alternating current motor 5. Further, even when the gain is not adjusted in accordance with the current i1 flowing in the alternating current motor 5 but the gain is adjusted in accordance with the torque current detecting value iq or the excited current detecting value id, a similar effect is achieved. Further, a similar effect is achieved even by adjusting the gain simultaneously with adjusting the filter time constant of the second filter portion 10 in accordance with the current i1 flowing in the alternating current motor 5. Or, even when the gain is not adjusted simultaneously with adjusting the filter time constant of the second filter portion in accordance with the current i1 flowing in the alternating current motor 5 but the gain is adjusted simultaneously with adjusting the filter time constant of the second filter portion in accordance with the torque current detecting value iq or the excited current detecting value id, a similar effect is achieved.

Further, although when the alternating current motor 5 is decelerated normally, the motor is decelerated in accordance with the speed reducing rate $f_{dec0}$ set by the speed reducing rate setting portion 12, when the load inertia of the alternating current motor 5 is large as explained above, the higher the speed, the larger the rotational energy provided to the alternating current motor 5, when the speed is reduced, the energy is reduced, and therefore, although the direct current bus line voltage is increased considerably in starting to decelerate, when the speed is reduced, the direct current bus line voltage is less increased, and when the loss of the alternating current motor 5 is increased, the direct current bus line voltage is not increased. The effect of bringing about the overexcited state by increasing the filter time constant of the second filter portion 10 is lost. Hence, according to the invention, as shown by FIG. 3, the direct current bus line voltage command value $V_{dc}{}^*$ in speed reducing is previously set, by adjusting the speed reducing rate such that the direct current bus line voltage detecting value $V_{dcfil1}$ outputted from the first filter portion 9 coincides with the direct current bus line voltage command value $V_{dc}{}^*$, the direct current bus line voltage can always be maintained at the direct current bus line voltage command value $V_{dc}{}^*$, and therefore, the overexcited state can always be maintained, and therefore, the alternating current motor 5 can be decelerated by a time period as short as possible.

Embodiment 3

Figure 6:
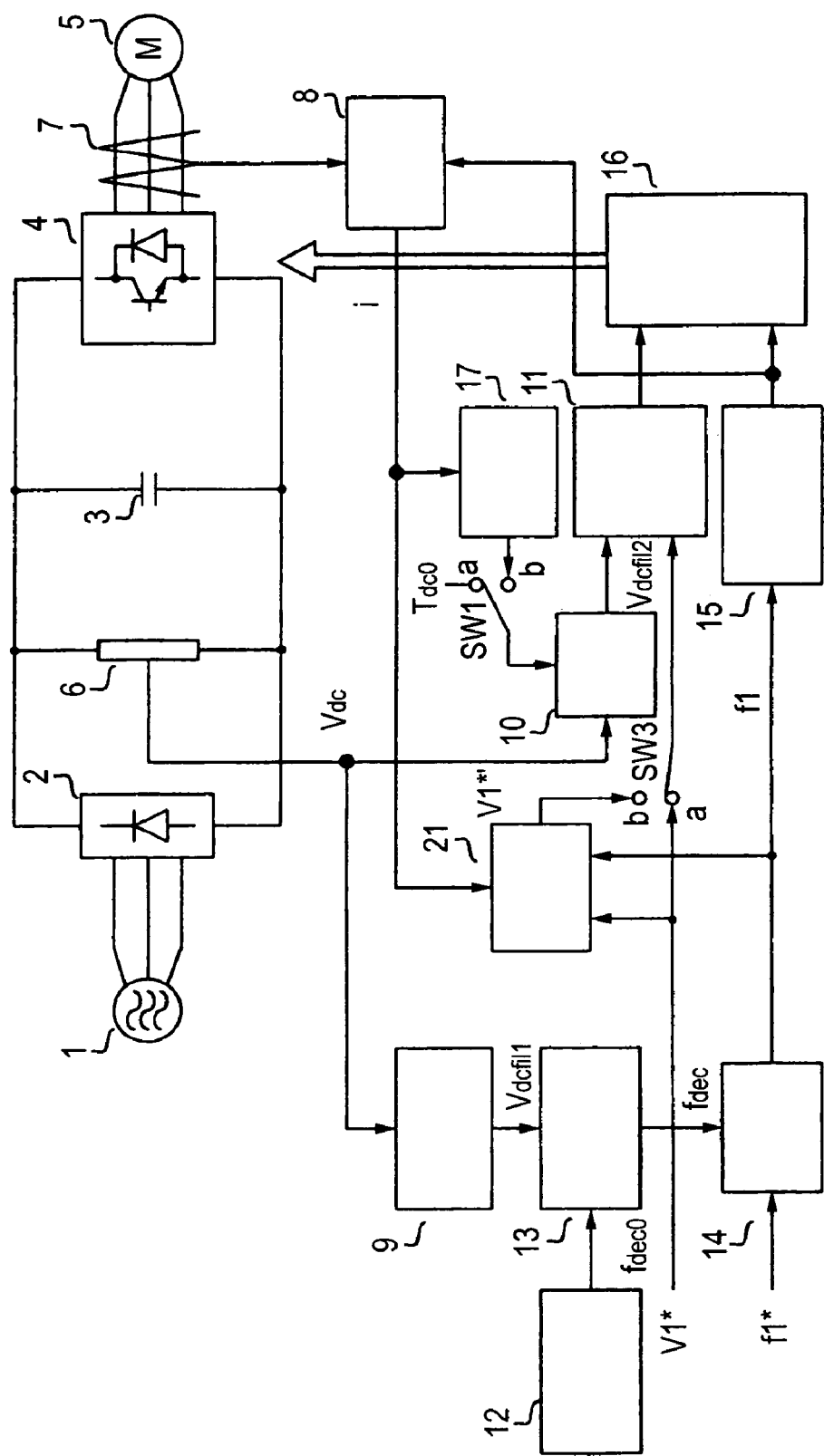
FIG. 6 is a block diagram of a third embodiment of an inverter apparatus to which a method of the invention is applied.
Figure 7:
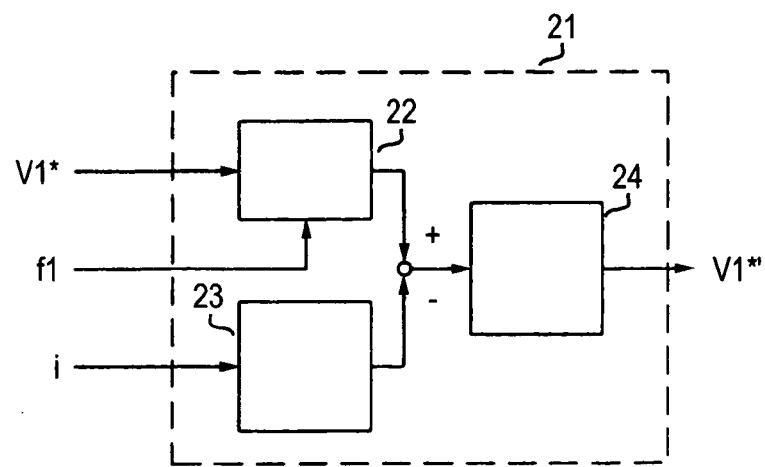
FIG. 7 is a block diagram of a voltage command adjusting portion.
Figure 8:
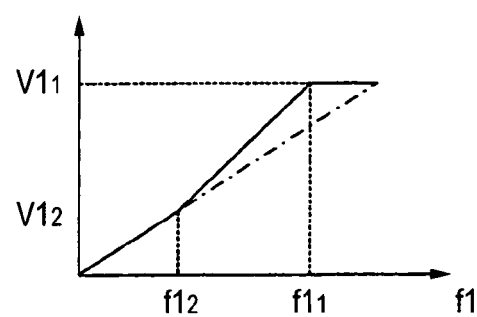
FIG. 8 shows an example of a voltage command holding portion.
Figure 9:
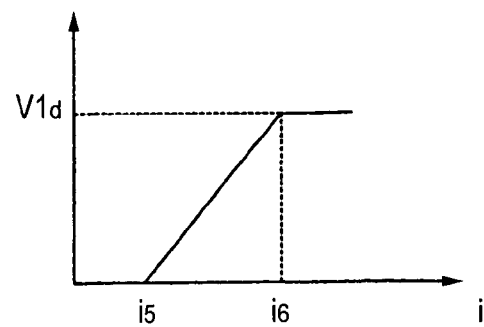
FIG. 9 shows an example of a voltage command reducing amount calculating portion.
Figure 10:
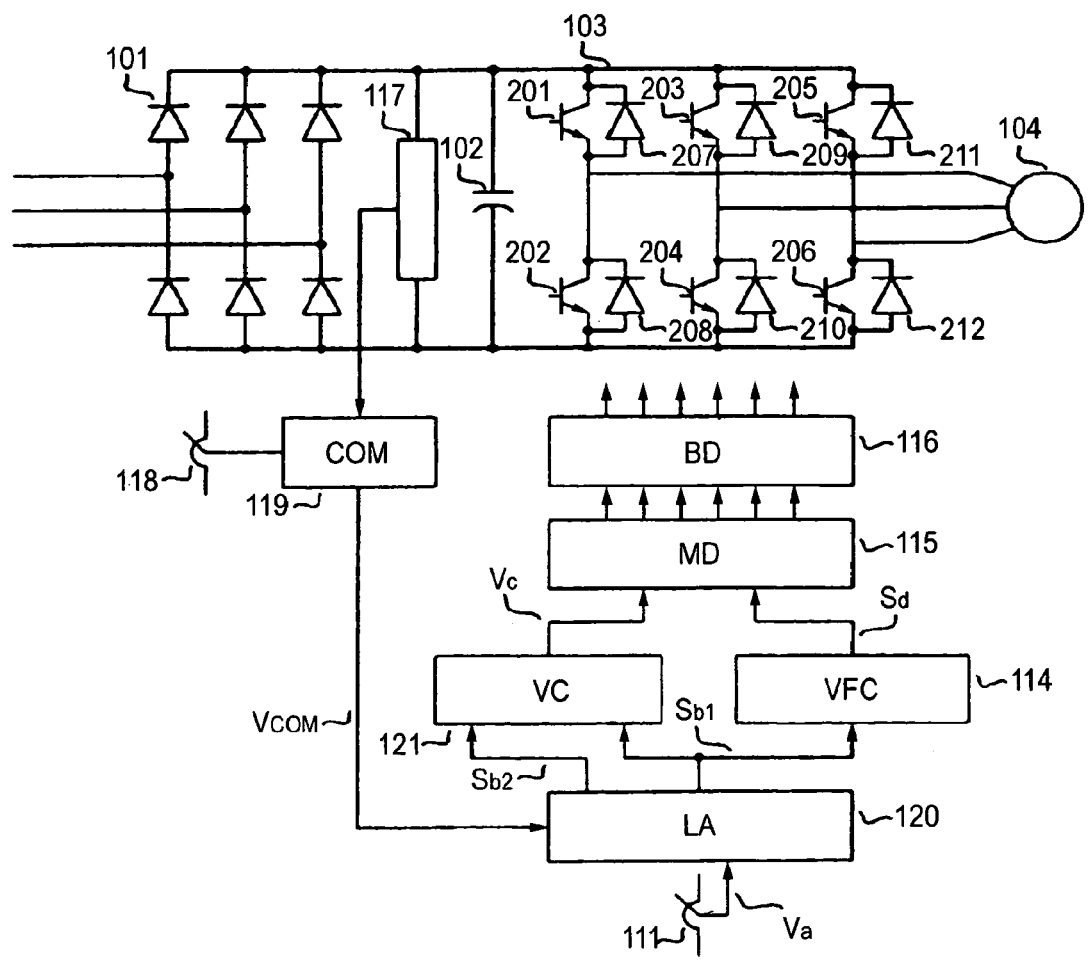
FIG. 10 is a block diagram of a first embodiment of an inverter apparatus of a related art.
Figure 11:
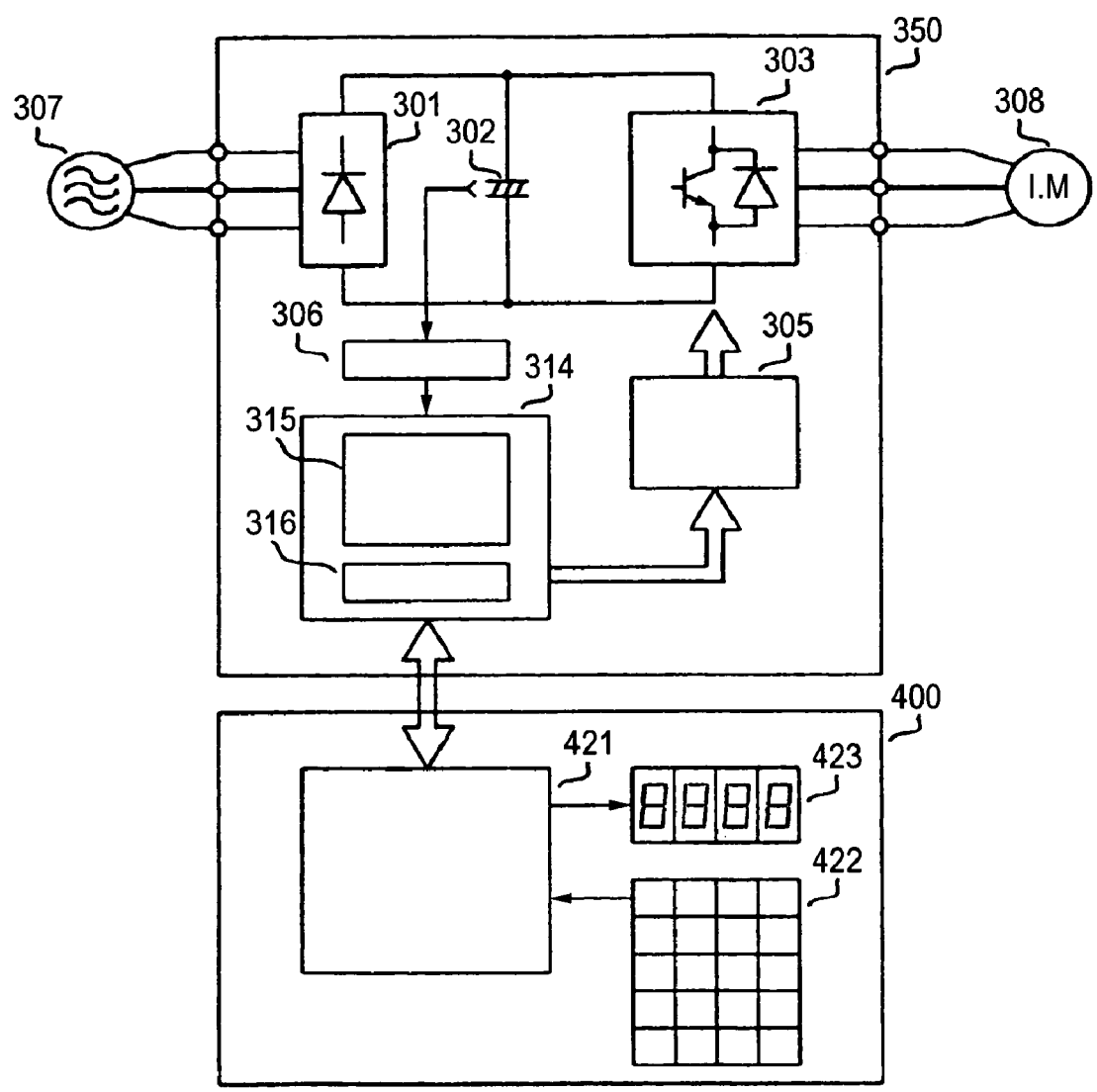
FIG. 11 is a block diagram of a second embodiment of an inverter apparatus of a related art.
Figure 12:
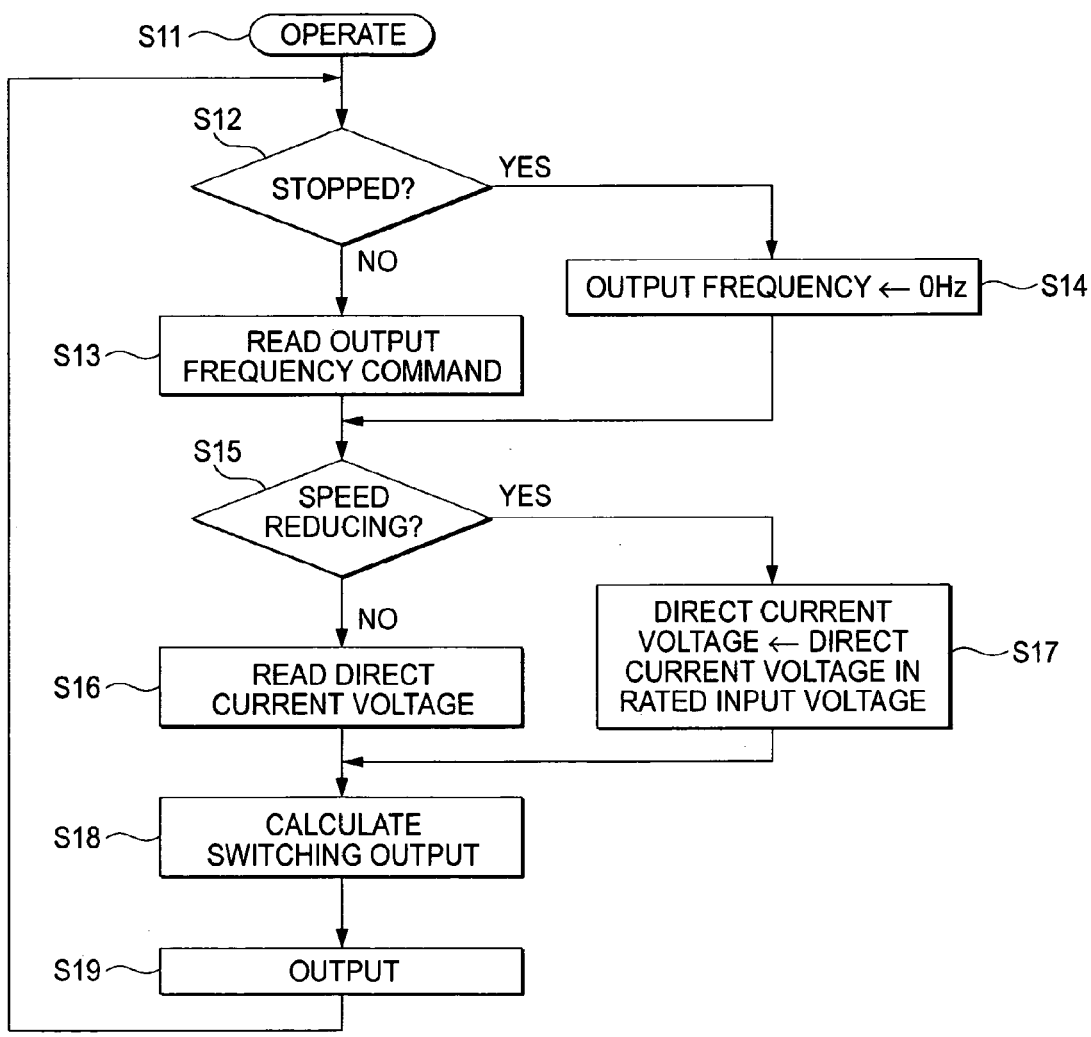
FIG. 12 is a flowchart in operating the second embodiment of the inverter apparatus of the related art.

FIG. 6 is a block diagram of a third embodiment of an inverter apparatus to which a method of the invention is applied, FIG. 7 is a block diagram of a voltage command adjusting portion, FIG. 8 shows an example of a voltage command holding portion, FIG. 9 shows an example of a voltage command reducing amount calculating portion. A control apparatus of the induction motor according to the embodiment includes the alternating current power source 1, the converter portion 2, the capacitor 3, the inverter portion 4, the alternating current motor 5, the direct current bus line voltage detecting portion 6, the current detector 7, the current converting portion 8, the first filter portion 9, the second filter portion 10, the voltage command correcting portion 11, the speed reducing rate setting portion 12, the speed reducing rate calculating portion 13, SFS 14, the frequency/phase converting portion 15, the PWM calculating portion 16, the time constant adjusting portion 17, a voltage command adjusting portion 21 and switches SW1, SW3. The converter portion 2 of the inverter apparatus rectifies the alternating current voltage of the alternating current power source 1 to be converted to the direct current voltage. The capacitor 3 smoothes the direct current voltage converted by the converter portion 2. The inverter portion 4 converts the direct current to the alternating current having an arbitrary frequency and an arbitrary voltage by controlling the power element by the PWM control to supply to the alternating current motor 5. The direct current bus line voltage detecting portion 6 detects the direct current bus line voltage $V_{dc}$ applied across the both ends of the capacitor 3. The current detector 7 detects the current supplied to the alternating current motor 5. The current converting portion 8 divides the current detected by the current detector 7 into the current i1 flowing in the alternating current motor and the torque current detecting value iq and the excited current detecting value id. The first filter portion 9 outputs the direct current bus line voltage $V_{dc}$ detected by the direct current bus line voltage detecting portion 6 as the direct current bus line voltage detecting value $V_{dcfil1}$ which has passed through the first order lag filter having the time constant $T_{dc0}$. The second filter portion 10 outputs the direct current bus line voltage $V_{dc}$ detected by the direct current bus line voltage detecting portion 6 as the direct current bus line voltage correcting value $V_{dcfil2}$ which has passed through the first order lag filter having the time constant $T_{dc}$. The voltage command adjusting portion 21 outputs the voltage command $V1^{*\prime}$ in accordance with the arbitrary voltage command $V1^{*\prime}$ and the arbitrary output frequency f1 and in accordance with the magnitude of the current flowing in the alternating current motor 5 as shown by FIG. 7. The voltage command correcting portion 11 calculates the voltage command correcting value from the direct current bus line voltage correcting value $V_{dcfil2}$ such that the voltage command $V1^{*\prime}$ after adjustment and the output voltage of the inverter portion 4 coincide with each other. The speed reducing rate setting portion 12 is means for setting the speed reducing time period until stopping the alternating current motor from the maximum rotational number by a constant or a voltage signal or the like. The speed reducing rate calculating portion 13 is means for calculating the optimum speed reducing rate $f_{dec}$ from the speed reducing rate $f_{dec0}$ set by the speed reducing rate setting portion 12 such that the direct current bus line voltage detecting value $V_{dcfil1}$ is maintained constant. SFS14 is means for outputting the output frequency f1 in accordance with the acceleration rate previously set with the frequency command f1* by the acceleration time setting means, not illustrated, or the speed reducing rate calculated by the speed reducing rate calculating portion 13. The frequency/phase converting portion 15 inputs the output frequency f1 outputted from the SFS14 and calculates the voltage phase. The PWM calculating portion 16 calculates the PWM signal from the voltage command correcting value from the voltage command correcting portion 11 and the voltage phase from the frequency/phase converting portion 15. The power element of the inverter portion 4 is driven by the PWM signal outputted from the PWM calculating portion 16. FIG. 7 shows an embodiment of the voltage command adjusting portion 21 constituted by a voltage command holding portion 22, a voltage command reducing amount calculating portion 23, a limit portion 24 for limiting a result of subtracting an output of the voltage command reducing amount calculating portion 23 from an output of the voltage command holding portion 22 such that the output voltage command is not made to be lower than a previously set relationship between the output frequency and the output voltage command as shown by a broken line of FIG. 8, and a specific operation thereof will be described later. FIG. 8 shows an embodiment of the voltage command holding portion 22, showing a relationship between the output frequency at the abscissa and the output voltage command at the ordinate. The output voltage is calculated in accordance with the frequency inputted to voltage command holding portion 22, and a specific operation thereof will be described later. FIG. 9 shows an embodiment of the voltage command reducing amount calculating portion 23, showing a relationship between the current at the abscissa and the output voltage reducing amount at the ordinate. The amount of reducing the output voltage is calculated in accordance with the current inputted to the voltage command reducing amount calculating portion 23, and a specific operation thereof will be described later.

A specific explanation will be given of an operation in a case of shifting from the normal operating state to the speed reducing state according to the invention. First, in the normal control state, SW3 is on a side; a voltage command inputted to the voltage command correcting portion 11 becomes the arbitrary voltage command V1*, at the same time, SW1 is on a side, the filter time constant of the second filter portion is operated by the filter time constant $T_{dc0}$ the same as the filter time constant of the first filter portion, and therefore, the output voltage of the inverter portion 4 coincides with the voltage command value V1*. When the speed reducing command is inputted, SW1 and SW3 are switched to b sides. At that time, the voltage command inputted to the voltage command correcting portion 11 becomes a voltage command V1*' after adjustment outputted by the voltage command adjusting portion 21. According to the operation of the voltage command adjusting portion 21, when the frequency is higher than previously set $f1_1$ at the voltage command holding portion 22 as shown by FIG. 8, the voltage command when speed reducing is started is maintained, when the speed is reduced more than $f1_1$, a ratio of the frequency to the voltage is made to be proximate gradually to that as shown by the normal one-dotted broken line, further, when the speed is reduced more than $f1_2$, the voltage command V1*' after adjustment constituting the normal ratio of the voltage to the frequency is outputted. Further, the filter time constant of the second filter portion becomes the time constant $T_{dc1}$ far longer than $T_{dc0}$ by a multiplication factor of about 10 through 10000. Therefore, in speed reducing, the direct current bus line voltage correcting value $V_{dcfil2}$ outputted by the second filter portion 10 is maintained at the value in starting to reduce the speed. Actually, the direct current bus line voltage is increased by reducing the speed, and therefore, the voltage command correcting portion 11 is not operated correctly but calculates the voltage command correcting value for outputting the output voltage larger than the voltage command V1*' after adjustment. Thereby, the alternating current motor 5 is brought into the overexcited state, and therefore, iron loss or copper loss or the like at the alternating current motor 5 is increased, and therefore, the regenerative power returning to a side of the inverter apparatus is reduced, the inverter apparatus becomes difficult to be brought into the overvoltage state, and the speed reducing time period can be made to be shorter than that in the normal magnetic flux level.

On the other hand, in recent years, the alternating current motor 5 which is easy to be saturated magnetically is increased, even when intended to be overexcited, the motor is magnetically saturated, only the current flows and the magnetic flux is not increased further. When the inverter apparatus of the related art 2 is applied to the alternating current motor which is easy to be saturated magnetically, the motor is controlled by setting 283 V in speed reducing, and therefore, when the alternating current motor 5 is magnetically saturated, an excessively large current flows in the alternating current motor 5, there is a possibility that the inverter apparatus becomes abnormal by the overcurrent, or the alternating current motor 5 is burned by the current. Hence, according to the invention, as shown by FIG. 2, in accordance with the current i1 flowing in the alternating current motor 5, until i1 becomes $i1_1$, the filter time constant $T_{dc}$ of the second filter portion is constituted by $T_{dc1}$ far longer than the filter time constant $T_{dc0}$ of the first filter portion by the multiplication factor of about 10 through 10000, when exceeding $i1_1$, the filter time constant is gradually shortened, when $i1_2$ is reached, the direct current bus line voltage correcting value $V_{dcfil2}$ becomes swiftly proximate to the true value by adjusting the filter time constant to a value the same as the filter time constant $T_{dc0}$ of the first filter portion 9, and therefore, the state returns from the overexcited state to the normal magnetic flux state. By previously setting $i1_1$ and $i1_2$ from the characteristic of the inverter apparatus and the characteristic of the alternating current motor, even in the case of the alternating current motor which is easy to be saturated magnetically, the speed reducing time period can be shortened without a concern that the inverter apparatus becomes abnormal by the overcurrent or the alternating current motor 5 is burned. Further, even when the filter time constant of the second filter portion 10 is not adjusted in accordance with the current i1 flowing in the alternating current motor 5 but the filter time constant of the second filter portion 10 is adjusted in accordance with the torque current detecting value iq or the excited current detecting value id, a similar effect is achieved. Or, a similar effect is achieved by returning the state from the overexcited state to the normal state by adjusting the output of the voltage command holding portion 22 by the voltage command reducing amount calculating portion 23 in accordance with the current i1 flowing in the alternating current motor 5. Further, even when the rate of the voltage command to the frequency is not adjusted in accordance with the current i1 flowing in the alternating current motor 5, but the rate of the voltage command to the frequency is adjusted in accordance with the torque current detecting value iq or the excited current detecting value id, a similar effect is achieved. Further, even when the filter time constant of the second filter portion 10 is adjusted simultaneously with adjusting the rate of the voltage command to the frequency in accordance with the current i1 flowing in the alternating current motor 5, a similar effect is achieved. Further, even when the filter time constant of the second filter portion 10 is adjusted simultaneously with adjusting the rate of the voltage command to the frequency in accordance with the torque current detecting value iq or the excited current detecting value id, a similar effect is achieved.

Further, although the speed of the alternating current motor 5 is reduced normally, the speed is reduced in accordance with the speed reducing rate $f_{dec0}$ set by the speed reducing rate setting portion 12, as explained above, when the load inertia of the alternating current motor 5 is large, the higher the speed, the larger the rotational energy provided to the alternating current motor 5, when the speed is reduced, the energy is reduced, and therefore, although the direct current bus line voltage is increased considerably in starting to reduce the speed, when the speed is reduced, the direct current bus line voltage is less increased, when the loss of the alternating current motor 5 is increased, the direct current bus line voltage is not increased. The effect of bringing about the overexcited state by increasing the filter time constant of the second filter portion 10 is lost. Hence, according to the invention, as shown by FIG. 3, the direct current bus line voltage command value $V_{dc}*$ in speed reducing is previously set, by adjusting the speed reducing rate such that the direct current bus line voltage detecting value $V_{dcfil1}$ outputted from the first filter portion 9 coincides with the direct current bus line voltage command value $V_{dc}^*$, the direct current bus line voltage can always be maintained at the direct current bus line voltage command value $V_{dc}^*$, and therefore, the overexcited state can always be maintained, and therefore, the speed of the alternating current motor 5 can be reduced by a time period as short as possible.

INDUSTRIAL APPLICABILITY

Although according to the invention, an explanation has been given of the example of the inverter apparatus for converting the alternating current power source to the direct current by the converter portion, even in a case of an inverter apparatus replacing the alternating current power source and the converter portion by a direct current power source of the battery or the like, by reducing the speed of the alternating current motor in the overexcited state by a similar method, the speed reducing time period can be shortened. Further, although the time constant adjusting portion 17 of FIG. 2 is shown by the example of changing the time constant linearly relative to the current detecting value, even when defined by an arbitrary function, a similar effect is achieved. Further, although the speed reducing rate calculating portion 13 is shown by the embodiment of the speed reducing rate, even when a relationship between an input and an output thereof is replaced by the speed reducing time period, no problem is posed. Further, although the PI control portion is used such that the direct current bus line voltage coincides with the direct current bus line voltage command value, P controlling means may be used, or the speed reducing rate may be controlled by using other arbitrary function. Further, although the gain adjusting portion 19 of FIG. 5 is shown by the example of changing the gain linearly relative to the current detecting value, even when defined by an arbitrary function, a similar effect is achieved. Further, although the voltage command holding portion 12 of FIG. 8 changes the frequency such that the original rate of the frequency to the voltage is constituted linearly until $f1_2$ from $f1_1$, a similar effect is achieved even by an arbitrary function. Further, although the voltage command reducing amount calculating portion 23 calculates the voltage reducing amount by providing a dead zone to the current or in proportion to the current, a similar effect is achieved even by an arbitrary function.

The invention claimed is:

1. An inverter apparatus comprising:
   a converter portion for converting an alternating current voltage into a direct current voltage,
   a capacitor for smoothing the direct current voltage,
   an inverter portion for driving an alternating current motor by converting the direct current voltage into an alternating current,
   a current converting portion for generating a detecting value of a current flowing in the motor, and
   a PWM calculating portion for generating a signal for driving a gate of a power element,
   a direct current voltage detecting portion for detecting the direct current voltage;
   a first filter portion and a second filter portion constituting two low pass filters for filtering an output of the direct current voltage detecting portion;
   a speed reducing rate setting portion for setting a speed reducing time period of the motor;
   a speed reducing rate calculating portion for calculating a frequency of driving the motor from an output of the first filter portion and an output of the speed reducing rate setting portion; and
   a voltage command correcting portion for correcting a voltage command from an output of the second filter portion and a given voltage command, wherein
   in speed reducing, a time constant of the second filter portion is constituted by 10 through 10000 times as much as a time constant of the first filter portion.

2. The inverter apparatus according to claim 1, wherein when the current detecting value becomes equal to or larger than a predetermined value, in accordance with a magnitude of the current, the time constant of the second filter portion is gradually reduced from an initial value in speed reducing to the time constant of the first filter portion.

3. The inverter apparatus according to claim 1, wherein when a d-axis current detecting value calculated from the current detecting value becomes equal to or larger than a predetermined value, in accordance with a magnitude of the d-axis current, the time constant of the second filter portion is gradually reduced from an initial value in speed reducing to the time constant of the first filter portion.

4. The inverter apparatus according to claim 1, wherein when a q-axis current detecting value calculated from the current detecting value becomes equal to or larger than a predetermined value, in accordance with a magnitude of the q-axis current, the time constant of the second filter portion is gradually reduced from an initial value in speed reducing to the time constant of the first filter portion.

5. The inverter apparatus according to claim 1, wherein a previously set speed reducing time period is adjusted such that the output of the first filter portion becomes a previously set value in reducing a speed of the alternating current motor.

6. The inverter apparatus according to claim 1, further comprising:
   a multiplying portion for multiplying an arbitrary voltage command by 1 in normal operation and the output of the speed reducing rate setting portion by a previously set gain in speed reducing.

7. The inverter apparatus according to claim 6, wherein when the current detecting value becomes equal to or larger than a first predetermined current value, in accordance with a magnitude of the current, the time constant of the second filter portion is gradually reduced from an initial value in speed reducing to the time constant of the first filter portion, and
   when the current detecting value becomes equal to or larger than a second predetermined current value, in accordance with a magnitude of the current, the gain is gradually reduced to return to 1.

8. The inverter apparatus according to claim 6, wherein when a d-axis current detecting value calculated from the current detecting value becomes equal to or larger than a predetermined value, in accordance with a magnitude of the d-axis current, the time constant of the second filter portion is gradually reduced from an initial value in speed reducing to the time constant of the first filter portion, and
   when the d-axis current detecting value becomes equal to or larger than a first predetermined current value, in accordance with a magnitude of the current, the gain is gradually reduced to return to 1.

9. The inverter apparatus according to claim 6, wherein
when a q-axis current detecting value calculated from the current detecting value becomes equal to or larger than a predetermined value, in accordance with a magnitude of the q-axis current, the time constant of the second filter portion is gradually reduced from an initial value in speed reducing to the time constant of the first filter portion, and when the q-axis current detecting value becomes equal to or larger than a first predetermined current value, in accordance with a magnitude of the current, the gain is gradually reduced to return to 1.

10. The inverter apparatus according to claim 6, wherein
a previously set speed reducing time period is adjusted such that the voltage detecting value outputted by the first filter portion becomes a previously set value in reducing the speed of the alternating current motor.

11. The inverter apparatus according to claim 1, wherein
the time constant of the second filter portion is made to be equal to or larger than the time constant of the first filter portion in speed reducing,
the frequency is reduced to a predetermined frequency while maintaining the voltage command, thereafter,
the speed of the motor is reduced by a previously set rate of the frequency to the voltage.

12. The inverter apparatus according to claim 11, wherein
when the current detecting value becomes equal to or larger than a predetermined value, in accordance with a magnitude of the current, the time constant of the second filter portion is reduced from an initial value in speed reducing to the time constant of the first filter portion, and when the current detecting value becomes equal to or larger than the predetermined value, in accordance with the magnitude of the current, even before the frequency is reduced to the predetermined value, the voltage command is reduced, and a rate of the frequency to the voltage is gradually returned to a rate in a normal control state.

13. The inverter apparatus according to claim 11, wherein
when a d-axis current detecting value calculated from the current detecting value becomes equal to or larger than a predetermined value, in accordance with a magnitude of the d-axis current, the time constant of the second filter portion is gradually reduced from an initial value in speed reducing to the time constant of the first filter portion, and when the d-axis current detecting value becomes equal to or larger than the predetermined value, in accordance with the magnitude of the d-axis current, even before reducing the frequency to the predetermined value, the voltage command is reduced, and a rate of the frequency to the voltage is gradually returned to a rate in the normal control state.

14. The inverter apparatus according to claim 11, wherein
when a q-axis current detecting value calculated from the current detecting value becomes equal to or larger than a predetermined value, in accordance with a magnitude of the q-axis current, the time constant of the second filter portion is gradually reduced from an initial value in speed reducing to the time constant of the first filter portion, and when the q-axis current detecting value becomes equal to or larger than the predetermined value, in accordance with the magnitude of the q-axis current, even before reducing the frequency to the predetermined value, the voltage command is made to be equal to or smaller than the voltage command in the normal control state, and a rate of the frequency to the voltage is gradually returned to a rate in the normal control state.

15. The inverter apparatus according to claim 11, wherein
a previously set speed reducing time period is adjusted such that the voltage detecting value outputted by the first filter becomes a previously set value in reducing the speed of the alternating current motor.

16. A method of reducing a speed of a motor of an inverter apparatus including: a converter portion for converting an alternating current voltage into a direct current voltage, a capacitor for smoothing the direct current voltage, an inverter portion for driving an alternating current motor by converting the direct current voltage into an alternating current, a current converting portion for generating a current detecting value, and a PWM calculating portion for generating a signal for driving a gate of a power element of the inverter portion;

the method comprising:
a step of detecting the direct current voltage;
a step of calculating the current detecting value;
a step of filtering the direct current voltage by a first filter portion;
a step of filtering the direct current voltage by a second filter portion by a time constant the same as a time constant of the first filter portion in normal operation and by a time constant larger than the time constant of the first filter portion by a multiplication factor of 10 through 10000 in speed reducing;
a step of calculating a frequency of driving the motor by a speed reducing rate set by a speed reducing rate setting portion for setting a speed reducing time period of the motor and an output of the first filter portion; and
a step of correcting a voltage command from an output of the second filter portion and a given voltage command.

17. The method of reducing a speed of a motor of an inverter apparatus according to claim 16, wherein
when the current detecting value becomes equal to or larger than a predetermined value, in accordance with a magnitude of the current, the time constant of the second filter portion is gradually reduced from an initial value in speed reducing to the time constant of the first filter portion.

18. The method of reducing a speed of a motor of an inverter apparatus according to claim 16, wherein
when a d-axis current detecting value calculated from the current detecting value becomes equal to or larger than a predetermined value, in accordance with a magnitude of the d-axis current, the time constant of the second filter portion is gradually reduced from an initial value in speed reducing to the time constant of the first filter portion.

19. The method of reducing a speed of a motor of an inverter apparatus according to claim 16, wherein
when a q-axis current detecting value calculated from the current detecting value becomes equal to or larger than a predetermined value, in accordance with a magnitude of the q-axis current, the time constant of the second filter portion is gradually reduced from an initial value in speed reducing to the time constant of the first filter portion.

20. The method of reducing a speed of a motor of an inverter apparatus according to claim 16, wherein
a previously set speed reducing time period is adjusted such that the voltage detecting value outputted by the first filter portion becomes a previously set value in reducing the speed of the alternating current motor.

21. The method of reducing a speed of a motor of an inverter apparatus according to claim 16, further comprising:
   a step of multiplying the voltage command given by a multiplying portion by 1 in normal operation and by a previously set gain in speed reducing; and
   a step of correcting the voltage command from an output of the multiplying portion and an output of the second filter portion.

22. The method of reducing a speed of a motor of an inverter apparatus according to claim 21, further comprising:
   a step of gradually reducing the time constant of the second filter portion from an initial value in speed reducing to the time constant of the first filter portion in accordance with a magnitude of the current when the current detecting value becomes equal to or larger than a predetermined value, and gradually reducing the gain to return to 1 in accordance with a magnitude of the current when the current detecting value becomes equal to or larger than a first predetermined value.

23. The method of reducing a speed of a motor of an inverter apparatus according to claim 21, further comprising:
   a step of gradually reducing the time constant of the second filter portion from an initial value in speed reducing to the time constant of the first filter portion in accordance with a magnitude of a d-axis current when the d-axis current detecting value calculated from the current detecting value becomes equal to or larger than a predetermined value, and gradually reducing the gain to return to 1 in accordance with the magnitude of the current when the d-axis current detecting value becomes equal to or larger than a first predetermined value.

24. The method of reducing a speed of a motor of an inverter apparatus according to claim 21, further comprising:
   a step of gradually reducing the time constant of the first filter portion from an initial value in speed reducing to the time constant of the first filter portion in accordance with a magnitude of a q-axis current when the q axis current detecting value calculated from the current detecting value becomes equal to or larger than a predetermined value, and gradually reducing the gain to return to 1 in accordance with the magnitude of the current when the q-axis current detecting value becomes equal to or larger than a first predetermined value.

25. The method of reducing a speed of a motor of an inverter apparatus according to claim 21, further comprising:
   a step of adjusting a previously set speed reducing time period such that the voltage detecting value of the first filter portion becomes a previously set value in reducing the speed of the alternating current motor.

26. The method of reducing a speed of a motor of an inverter apparatus according to claim 15, further comprising:
   a step of gradually reducing the time constant of the second filter portion from an initial value in speed reducing to the time constant of the first filter portion in accordance with a magnitude of the q-axis current when the q-axis current detecting value calculated from the current detecting value becomes equal to or larger than a predetermined value and making the voltage command equal to or smaller than the voltage command in the normal operating state, and gradually returning a rate of the frequency to the voltage to a rate in the normal control state even before reducing the frequency to the predetermined value in accordance with the magnitude of the q-axis current when the q-axis current detecting value becomes equal to or larger than the predetermined value.

27. The method of reducing the speed of a motor of an inverter apparatus according to claim 16, further comprising:
   a step of reducing only the frequency while maintaining only the voltage command, and reducing the speed of the motor by a rate set with the frequency and the voltage when the frequency is reduced to a predetermined frequency.

28. The method of reducing a speed of a motor of an inverter apparatus according to claim 27, further comprising:
   a step of gradually reducing the time constant of the second filter portion from an initial value in speed reducing to the time constant of the first filter portion in accordance with a magnitude of the current when the current detecting value becomes equal to or larger than a predetermined value and also making the voltage command equal to or smaller than the voltage command in the normal control state, and gradually returning a rate of the frequency to the voltage to a rate in the normal control state even before reducing the frequency to the predetermined value in accordance with the magnitude of the current when the current detecting value becomes equal to or larger than the predetermined value.

29. The method of reducing a speed of a motor of an inverter apparatus according to claim 27, further comprising:
   a step of gradually reducing the time constant of the second filter portion from an initial value in speed reducing to the time constant of the first filter portion in accordance with a magnitude of a d-axis current when the d-axis current detecting value calculated from the current detecting value becomes equal to or larger than a predetermined value and making the voltage command equal to or smaller than the voltage command in the normal operating state, and gradually returning a rate of the frequency to the voltage to a rate in the normal control state even before reducing the frequency to the predetermined value in accordance with the magnitude of the d-axis current when the d-axis current detecting value becomes equal to or larger than the predetermined value.

30. The method of reducing a speed of a motor of an inverter apparatus according to claim 27, further comprising:
   a step of adjusting a previously set speed reducing time period such that the voltage detecting value outputted by the first filter portion becomes a previously set value in reducing the speed of the alternating current motor.

* * * * *